United States Patent
Alhandy

(10) Patent No.: US 10,171,577 B2
(45) Date of Patent: Jan. 1, 2019

(54) LOCAL AREA NETWORKING SYSTEM

(71) Applicant: Hassen Damon Alhandy, Sylvania, OH (US)

(72) Inventor: Hassen Damon Alhandy, Sylvania, OH (US)

(73) Assignee: WIFIFACE LLC, Toledo, OH (US)

( * ) Notice: Subject to any disclaimer, the term of this patent is extended or adjusted under 35 U.S.C. 154(b) by 0 days.

(21) Appl. No.: 15/418,883

(22) Filed: Jan. 30, 2017

(65) Prior Publication Data

US 2017/0142198 A1    May 18, 2017

Related U.S. Application Data

(63) Continuation-in-part of application No. 14/104,684, filed on Dec. 12, 2013, now Pat. No. 9,560,158.

(51) Int. Cl.
*G06F 15/177* (2006.01)
*H04L 29/08* (2006.01)
(Continued)

(52) U.S. Cl.
CPC ..... *H04L 67/1044* (2013.01); *G06Q 30/0261* (2013.01); *G06Q 30/0267* (2013.01);
(Continued)

(58) Field of Classification Search
CPC ............ H04L 67/1044; G06Q 30/0261; G06Q 30/0267
(Continued)

(56) References Cited

U.S. PATENT DOCUMENTS 7,523,211 B2   4/2009   Takabayashi et al.
7,546,372 B2   6/2009   Allen et al.
(Continued)

FOREIGN PATENT DOCUMENTS

WO   2010049568 A1   5/2010

OTHER PUBLICATIONS

Has anyone seen my goose? social network services in developing regions. Vallina-Rodriguez, Narseo, Pan Hui, and John Crowcroft. 2009. http://www.cl.cam.ac.uk/~nv240/papers/goose_final_socialCamWorkshop.pdf.

*Primary Examiner* — Vivek Srivastava
*Assistant Examiner* — Atta Khan
(74) *Attorney, Agent, or Firm* — Jacob M. Ward; Ward Law Office LLC

(57) ABSTRACT

A local area networking method includes a receiving by a system server unique identifiers associated with the first mobile device and other devices of a local area network. The system server correlates a listing of user identifiers and user profiles with the unique identifiers received from the first mobile device. The system server then communicates the listing of user identifiers and user profiles correlated with the unique identifiers to the first mobile device. A user of the first mobile device is thereby permitted to view the user identifiers and user profiles relating to the other devices registered with the system server, including the other devices in the local area network. The system server may further receive a geographical location of the local area network from the first mobile device, and associate one of a data file and an executable file from the first mobile device with the geographical location.

12 Claims, 16 Drawing Sheets

(51) Int. Cl.
  *H04W 8/24* (2009.01)
  *H04W 4/02* (2018.01)
  *G06Q 30/02* (2012.01)
  *G06Q 50/00* (2012.01)
  *H04L 29/06* (2006.01)

(52) U.S. Cl.
  CPC ........... *G06Q 50/01* (2013.01); *H04L 67/025* (2013.01); *H04L 67/10* (2013.01); *H04L 67/141* (2013.01); *H04L 67/18* (2013.01); *H04L 67/306* (2013.01); *H04L 67/42* (2013.01); *H04W 4/02* (2013.01); *H04W 8/24* (2013.01)

(58) Field of Classification Search
  USPC ......................................................... 709/220
  See application file for complete search history.

(56) References Cited

U.S. PATENT DOCUMENTS

| | | | |
|---|---|---|---|
| 7,849,205 B2 | 12/2010 | Pounds et al. | |
| 7,886,033 B2 | 2/2011 | Hopmann et al. | |
| 8,078,696 B2 | 12/2011 | LaJoie et al. | |
| 8,234,119 B2 | 7/2012 | Dhawan et al. | |
| 8,266,266 B2 | 9/2012 | Short et al. | |
| 8,402,134 B1 | 3/2013 | Hir | |
| 8,510,381 B1* | 8/2013 | Birand | G06Q 10/10 709/204 |
| 2003/0023690 A1 | 1/2003 | Lohtia | |
| 2004/0068653 A1* | 4/2004 | Fascenda | H04L 9/0844 713/168 |
| 2006/0046709 A1* | 3/2006 | Krumm | H04N 21/4126 455/422.1 |
| 2006/0052057 A1* | 3/2006 | Persson | H04M 1/72522 455/41.2 |
| 2006/0173974 A1 | 8/2006 | Tang | |
| 2007/0281690 A1* | 12/2007 | Altman | H04W 4/185 455/435.1 |
| 2008/0028063 A1* | 1/2008 | Holmes | G06Q 10/107 709/224 |
| 2008/0318591 A1* | 12/2008 | Oliver | G01S 3/46 455/456.1 |
| 2009/0181653 A1* | 7/2009 | Alharayeri | H04W 4/02 455/414.1 |
| 2009/0215469 A1* | 8/2009 | Fisher | H04L 12/588 455/456.3 |
| 2010/0274859 A1 | 10/2010 | Bucuk | |
| 2011/0040870 A1* | 2/2011 | Wynn | H04L 63/0428 709/224 |
| 2012/0084187 A1* | 4/2012 | Sperling | G06Q 30/04 705/34 |
| 2012/0135711 A1 | 5/2012 | Jabara et al. | |
| 2012/0281686 A1* | 11/2012 | Pollari | G06Q 30/02 370/338 |
| 2012/0329554 A1* | 12/2012 | Mgrdechian | G06Q 30/0207 463/29 |
| 2013/0067085 A1 | 3/2013 | Hershko et al. | |
| 2013/0167196 A1 | 6/2013 | Spencer et al. | |
| 2013/0198383 A1 | 8/2013 | Tseng et al. | |
| 2013/0217332 A1 | 8/2013 | Altman et al. | |

* cited by examiner

| SETTINGS | SYSTEM | FRIENDS | NOTIFICATIONS | HOTSPOTS | SEARCH |
|---|---|---|---|---|---|
| HOTSPOT NAME | # OF SYSTEM USERS | # OF WIFI USERS | REFRESH | | |

SYSTEM SETTINGS —754

VIEW BLOCKED USERS BY USERNAME—756

ALLOW SYSTEM ACCESS TO APPS (MAKES THEM VISIBLE OVER SYSTEM)

ALLOW THE TRANSFER OF DATA BETWEEN LIKE APPLICATION OVER SYSTEM WITH ANY ONE WHEN A PLAY OR SHARE REQUEST IS SENT AND OR ACCEPTED

ALLOW THE TRANSFER OF THE DATA BETWEEN LIKE APPLICATION OVER SYSTEM FRIENDS ONLY

ALLOW THE THE SYSTEM APPLICATIONS BLUETOOTH CAPABILITY

CHANGE SETTINGS OR REGISTERED INFORMATION

APPLICATION SETTINGS —766

APP NAME—768

ALLOW THE TRANSFER OF THE DATA IN THIS APPLICATION OVER THE SYSTEM. (ALLOWS PLAY AND SHARE FEATURES TO BE ACCEPTED)

ALLOW THE TRANSFER OF DATA IN THIS APPLICATION OVER SYSTEM BETWEEN FRIENDS ONLY.—772

ALLOW APPLICATION BLUETOOTH CAPABILITY—774

FIG. 7

LOCAL AREA NETWORKING SYSTEM

CROSS-REFERENCE TO RELATED APPLICATIONS

This application is a continuation-in-part of U.S. patent application Ser. No. 14/104,684, filed on Dec. 12, 2013, and which issued on Jan. 31, 2017 as U.S. Pat. No. 9,560,158. The entire disclosure of the above application is hereby incorporated herein by reference.

FIELD OF THE INVENTION

This invention relates to social networking system and, more particularly, to a social networking system and method for identifying user profiles and exchanging files and applications over a local area network.

BACKGROUND OF THE INVENTION

Individuals have historically networked with one another by joining social clubs, attending social events, meeting friends through other friends, and so forth. The Internet has made keeping in touch with friends and acquaintances more convenient for many people. For other people, the Internet provides a social forum for networking and meeting new people.

Internet users employ social networking to communicate with friends, family, acquaintances and people who may have similar interests, for example, by sharing photos, videos, and messages either publically for all of their network and possibly the Internet to see, or privately from one person to another.

In order to facilitate communications between vast numbers of individuals, various social networking websites have been developed in recent years. Social networking websites can provide organizational tools and forums for allowing these individuals to interact with one anther via the social networking website. Many users prefer to limit communications to specific groups of other users.

Known social networking websites have primarily been developed linking one user-created profile to another user-created profile. Conventionally, the link between profiles occurs when a request is sent and accepted between two users over a wide area network.

There is a continuing need for an improved social networking system and method for sharing user data and user applications over a local area network. Desirably, the social networking system provides users with the ability to identify other users over a local area network, as well as associates user data with the local area network for sharing with other users.

SUMMARY OF THE INVENTION

In concordance with the instant disclosure, an improved social networking system and method for sharing user data and user applications over a local area network, which provides users with the ability to identify other users over a local area network, as well as associates user data with the local area network for sharing with other users, has surprisingly been discovered.

In an exemplary embodiment, the invention relates to a networking service involving a multitude of user devices, a local area network (sometimes referred to as a "LAN") having a local server to which the devices are connected, and a wide area network (sometimes referred to as a "WAN") with a remote server on which the networking service is operated. The devices can both register with, and log into the remote server, over the wide area network. The remote server can store center entered profile information associated with the device, assign a platform-unique identifier to the device upon registration, and store the MAC address of the device. Additionally, the devices can scan the local area network and report to the remote server the IP address of the local server, as well as the MAC addresses of other devices in the local area network. The remote server than determines the platform unique identifier and profile information for each MAC address of a registered device in the same local area network and communicates this information to all of the logged in devices. The logged in devices can then display all the user profiles associated with other devices in the local area network that are also logged into the remote server and the MAC addresses of those devices that are not registered with the remote server.

In operation, once signed into the service, the individual devices are permitted to communicate directly between themselves within the local area network. This allows users, with approval, to view and access applications of other users over the same local area network or over the wide area network connection. Additionally, users are capable of performing other functions such as allowing users to declare specific applications on their networked accessible or inaccessible to other users and scan the local area network for specific individuals to share information with. Other features include an integrated marketplace for sharable applications, a search engine, a social network, and map-based geo-location functionality. The map-based geo-location functionality allows users to geographically view the location of the local area network from which a user has uploaded content to the remote server. The system also allows the content to be downloaded by other registered or non-registered users if also at the location of the same local area network.

In one embodiment, a local area networking method includes the provision of a system server in communication with a first mobile device over a wide area network. The system server has a processor coupled to a memory. The memory has processor-executable instructions and at least one database embodied thereon. The first mobile device is in communication with a local area network. The first mobile device is configured to query the local area network and identify unique identifiers associated with the first mobile device and a plurality of other devices of the local area network. The at least one database includes a listing of the unique identifiers associated with the other devices registered with the system server. The at least one database also includes a listing of user identifiers and user profiles relating to the other devices registered with the system server. The system server receives from the first mobile device the unique identifiers associated with the first mobile device and the other devices of the local area network. The system server then correlates the listing of user identifiers and user profiles with the unique identifiers received from the first mobile device. The listing of user identifiers and user profiles correlated with the unique identifiers are then communicated to the first mobile device. A user of the first mobile device is thereby permitted to view the user identifiers and user profiles relating to the other devices registered with the system server, including the other devices in the local area network.

In another embodiment, a local area networking method includes the provision of a system server in communication with a first mobile device over a wide area network. The first mobile device is in communication with a local area network. A geographical location of the local area network of the first mobile device is received by the system sever from the first mobile device. The system server associates one of a data file and an executable file from the first mobile device with the geographical location. The system server then communicates the geographical location to an other device registered with the system server. The other device registered with the system server is permitted to access the one of the data file and the executable file from the first mobile device when the other device is also at the geographical location.

In a further embodiment, a local area networking system includes a system server in communication with a first mobile device. The first mobile device is in communication with a local area network. The first mobile device has a processor coupled to a memory. The memory has a processor-executable instruction set embodied thereon. The first mobile device with the processor-executable instructions is configured by the processor to query a local area network and identify a unique identifier associated with the first mobile device and a plurality of other devices of the local area network. The system server also has a processor coupled to a memory. The memory of the system server has processor-executable instructions and at least one database embodied thereon. The at least one database includes a listing of the unique identifiers associated with the other devices registered with the system server. The at least one database also includes a listing of user information relating to the other devices registered with the system server. The system server with the processor-executable software instructions is configured by the processor to communicate the listing of user information relating to the other devices registered with the system server to the first mobile device. The user of the first mobile device is thereby permitted to view the user information relating to the other devices registered with the system server.

In yet another embodiment, a local area networking method includes a step of providing a system server in communication with a first mobile device over a wide area network and having a processor coupled to a memory. The memory has processor-executable instructions and at least one database embodied thereon. The at least one database includes a listing of unique identifiers associated with mobile devices and a local area server registered with the system server. The at least one database also includes a listing of user profiles associated with the mobile devices registered with the system server. The system server generates, on a graphical user interface of a first mobile device, a visual representation of a local area network including the mobile devices within the local area network and registered with the system server. The visual representation includes the user profiles of the mobile devices. The first mobile device is permitted to communicate or collaborate with the mobile devices registered with the system server via the graphical user interface.

In yet a further embodiment, the first mobile device queries the local area server when the first mobile devices is in the local area network or in range of the local area network. The first mobile device thereby obtains the unique identifiers associated with the local area server and associated with the mobile devices within the local area network. Next, the system server receives from the first mobile device, after the first mobile device has queried the local area server and before the first mobile device has communicated with the mobile devices of the local area network, the unique identifiers associated with the local area server and the mobile devices of the local area network. The system server then correlates the listing of user profiles with the unique identifiers received from the first mobile device. The system server then generates, on a graphical user interface of the first mobile device, a visual representation of the local area network including the mobile devices within the local area network and registered with the system server. The visual representation includes the user profiles of the other mobile devices. The first mobile device is permitted to communicate or collaborate with the mobile devices registered with the system server via the graphical user interface.

In yet an additional embodiment, a local area networking system includes a system server, a first mobile device, a local area server. The system server is in communication with the first mobile device over a wide area network and has a processor coupled to a memory. The memory has processor-executable instructions and at least one database embodied thereon. The at least one database including a listing of unique identifiers associated with mobile devices and the local area server registered or not registered with the system server. The at least one database further has a listing of user profiles associated with the mobile devices and local area server registered or not registered with the system server. The system server generates, on a graphical user interface of the first mobile device, a visual representation of a local area network including the mobile devices within the local area network and registered with the system server. The visual representation includes the user profiles of the mobile devices within the local area network. The first mobile device is permitted to communicate or collaborate with the mobile devices registered with the system server and within the local area network via the graphical user interface.

In an illustrative embodiment, an improved social networking system and method facilitates user-to-user communication over a local area network. Users of the system have the unique ability to send a message, send a friend request and send a request to use an application with other users over a local area network. Providing that a friend request is sent and accepted between two users, the two users then have the ability to communicate and use like applications over a wide area network.

Cross platform application functionality as well as application functionality over a local and wide area network in the prior art are extremely limiting, and have been unable to satisfactorily achieve goals in the industry. The platform of the present disclosures provides a unique way for users to communicate and use developed applications, as well as a unique way for developers to increase application functionality and increase cross platform functionality, thereby assisting to achieve goals that have been heretofore unreachable.

The present disclosure is a social networking tool that allows a user to give profile and applications access over a local area network to other participants of the social networking tool. Users have the unique ability to share applications used within this social networking environment, allowing each participant to not only show but see the applications everyone else who is connected to the social networking environment uses over a local area network within this social networking environment. After two users share a friend request and accept, they have the ability to perform all the same functionality over a wide area network connection. The platform creates a way for users to share profiles, applications used and application data information from within like applications with other users over a local area network. The same task can be performed over a wide area network providing users have become friends.

System Description:

The system acts as an environment for application sharing, application integration for developers across platforms, profile and application sharing over a local area network, application data integration for those sharing like applications over a local area network, and application data integration for those sharing like applications over a wide area network, providing user to user approval. The unique network application of the system allows users to view their surroundings once connected to a local area network digitally. Users can view the profiles of other users who are also connected to the local area network and signed in to the system. Users can view the applications of other users who are also connected to the local area network and are signed into the system. For each device connected to a local area network that does not use the system the device remains visible by MAC Address with a shared username in common. Users can declare specific applications visible or invisible by turning access to other applications on a user's device on or off within the system application, allowing specific application visibility over a local area network.

Method Description:

After a user downloads the unique network application of the system from the marketplace, they are limited to use of the system on a device where they will be required to fill out required elements. The required elements may include platform unique Email Address, Password, platform unique Username. Non-required registered data may include entering a First Name or Alias and Photo (both non required elements can be entered and changed after registration). Required data for registration may include the MAC Address. Providing the required elements and data are captured and accepted, the application will send out a verification link to the email address registered. Once the verification link is selected, the user gains access to a user account. The public profile on the unique network application system includes Username, First Name or Alias and uploaded photo when elements are available. Applications used will become public local area network knowledge when the device owner authorizes application use with the system. Application data will not become public local area network data; rather, the application data can be exchanged between two users with like applications after a friend request is accepted or a request to share data from like applications is accepted. The unique network application of the system captures the MAC Address of each device that connects to a local area network and through MAC Address and user account association System members enjoy a local are social network with increased options for application development.

Product and Service Description:

The system offers members the ability to search locations for people they may or may not know over across a local area network connection, for example, using cell phones, tablets, iPads and computers. Users have the ability to play other users in games, share data, and increase workplace efficiency all over a local area network connection. Users also have the same abilities with users over a wide area network connection, providing the users have exchanged a connection approval. The application also opens opportunities to currently undeveloped applications, and acts as a marketplace for developers to feature applications that have increased local area connection capabilities.

Application Uses:

The application can be used by users to scan local area networks for specific individuals with whom they have shared a previous encounter. The application can be used by users to scan local area networks for individuals who use similar or like applications. The application can be used by users to scan local area networks for individuals with whom to use specific applications. The application can be used by users to scan local area networks for individuals with whom to share specific application data. The application can be used by users to scan local area networks for individuals with whom they would like to use specific applications across a wide area network connection. The application can be used by users to scan local area networks for individuals with whom to share specific application data across a wide area network connection.

Platform Opportunities:

Platform opportunities exist for developers who create applications or increase already created application functionality to capitalize on the System market that becomes available. Increased cross platform functionality for developers featuring like applications across various marketplaces is an opportunity for developers to differentiate themselves from competition and capitalize on local area network application integration.

Competitive Advantage:

Conventional marketplaces force development with company objectives and goals in mind, which undesirably limits development application functionality and opportunities. As a result, marketplaces are kept separate and developers create applications for each marketplace separately. There has yet to be a reason for developers to increase cross platform functionality within applications due to marketplace application development guidelines. The system of the present disclosure provides the opportunity for developers to increase cross platform functionality, by providing a platform that will increase application downloads as a result of the system users being able to see the applications that are used by most of their friends and people they encounter. Applications that feature more cross platform functionality will be the most desired applications to use with the system. Applications that the most the system users allow access to will be featured by the system, as the most popular applications and as a result a marketplace that integrates all current marketplaces will be created. The competitive advantages the system brings to market for both users and developers is cross platform functionality and as a result the primary reason for marketplace application integration.

Related Products and Services:

The system has its own integrated marketplace for users who seek applications that feature both cross platform functionality as well as local area network application functionality. The system also has an application search engine and social network. Revenue possibilities stem from social networking features and functionality of the application, search engine features and functionality of the application and marketplace features and functionality.

Additionally, the system may include a map-based geo-location service for pictures videos, songs, messages and documents to be uploaded to a map, publically allowing anyone with the application to see and post pictures, videos, songs and documents to specific geographic locations on a map. The same service can also be done privately allowing users to upload pictures, videos, songs, messages and documents to a map that will only be visible to other users sharing the application to whom authorization has been granted.

The service may be monetized by allowing business's the ability to place digital advertisements, discounts and/or promotions on the map. Users can acquire this content by traveling to the geographic location of the digital advertisement, and using a device connected to geo-location service application servers. The content may be limited by the supplier of the advertisement.

Technology Used:

In one embodiment, a computer-implemented social networking method includes a step of maintaining in a computer system a plurality of user accounts. Each of the user accounts includes an Email Address, Username, Password, First Name or Alias, Photo and the device manufacturer with MAC Address and stored in a data base. Various elements stored in the data base will be visible to users in a graphical user interface. Additional elements may be included to increase user experience by expanding profile information and/or platform functionality.

Users are able to use the system on any and all platforms through graphical user interfaces on iPads, iPods, iPhones, desktops, laptops Android, and any device that connects to the Internet. Other types of devices with graphical user interfaces may also be employed, as desired.

Advantageously, the system may be used as a mobile operating system and as an individual marketplace for which third party developers can create applications. Within the marketplace this includes, but is not limited to, gaming applications, transaction applications, location applications, social networking applications, etc. Also, the functionality, as well as marketplace structure, can act as a mobile internet operating system. This system has the ability to allow any Internet service provider to regain application market share from competitors by offering different data rates to users using the operating system.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is an illustrative screen shot depicting settings, including user controls and permissions, of a mobile device in the local area networking system shown in FIG. 1;

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical unless otherwise disclosed.

Figure 1:
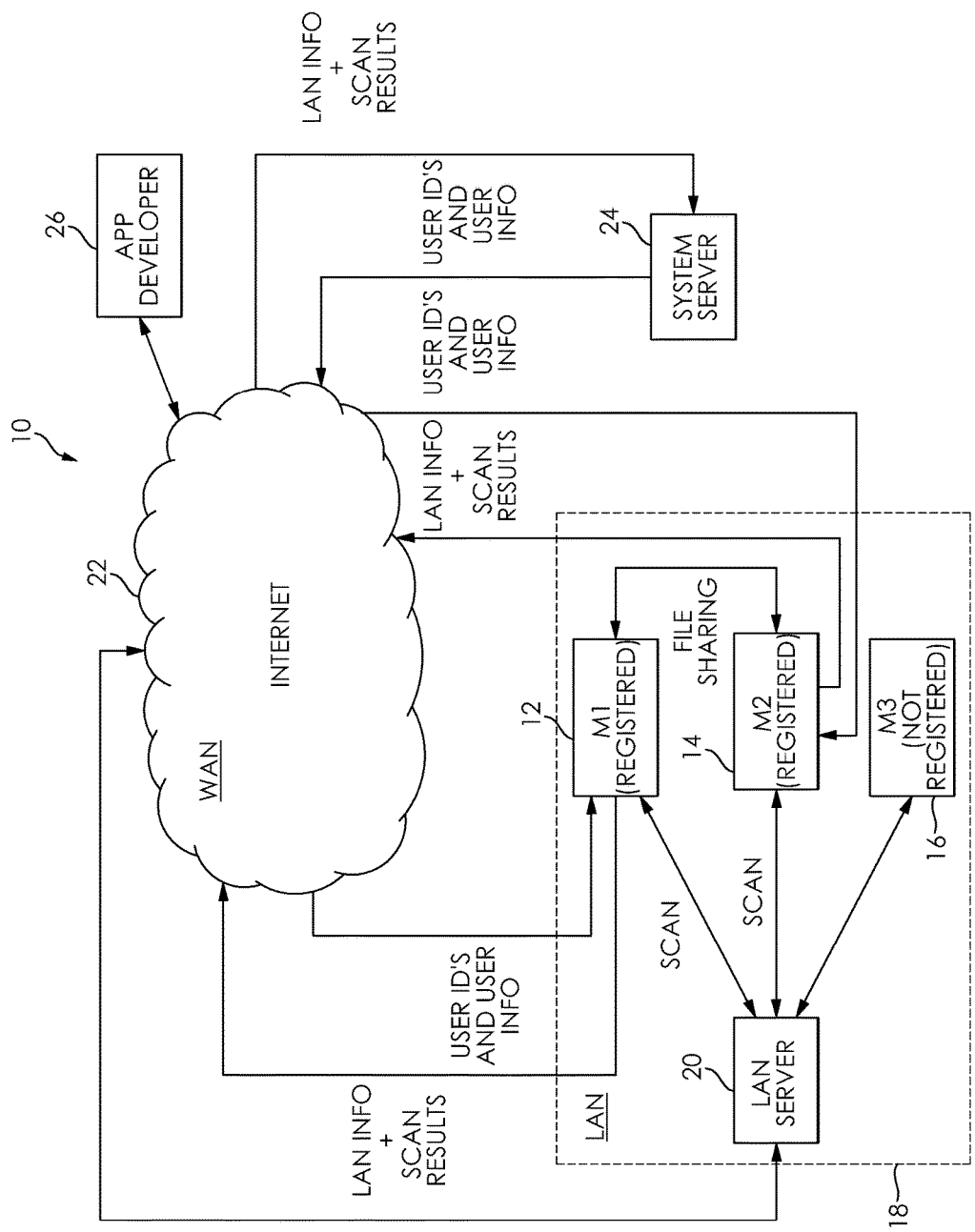
FIG. 1 is a schematic diagram of a local area networking system according to one embodiment of the present disclosure.

In FIG. 1, a local networking system 10 according to the present disclosure is shown. The local networking system 10 includes a plurality of mobile devices 12, 14, 16 in a local area network 18. The local area network 18 may include at least one of a router and a local area network server 20, for example, which is in communication with a wide area network 22, such as the Internet. In a particular embodiment, the local area network 18 is accessible by a wireless access point or "Hotspot", to which the mobile devices 12, 14, 16 may connect and be in communication.

The mobile devices 12, 14, 16 may include cell phones, smart phones, or tablet computers, as nonlimiting examples. In the embodiment shown, the plurality of mobile devices 12, 14, 16 includes a first mobile device 12, and other mobile devices 14, 16 including a second mobile device 14 and a third mobile device 16. Each of the mobile devices 12, 14, 16 may have a processor coupled to a memory. The memory may be in the form of a non-transitory computer readable storage medium, and have a processor-executable instruction set embodied thereon. One of ordinary skill in the art understands that only three of the mobile devices 12, 14, 16, are shown in FIG. 1 for purposes of simplicity, and that other types and numbers of the mobile devices 12, 14, 16 may also be used within the scope of the present disclosure.

In particular, the first mobile device 12 with the processor-executable instructions is configured by the processor to scan or query the local area network 18 and identify a unique identifier associated with both the first mobile device 12 and the other devices 14, 16 of the local area network 18. As a non-limiting example, each of the unique identifiers is a media access control (MAC) address. It should be appreciated that the unique identifier may include manufacturer information. Other type of unique identifiers may also be scanned for and obtained by the first mobile device 12, as desired.

For example, once the first mobile device 12 connects to the router the local area server 20, i.e., the DHCP or Static IP device within the local area network 18 that is supplying the IP addresses on the local area network 18, the connected first mobile device 12 then has the ability to view the other devices 14, 16 connected to the local area network 18. All of the mobile devices 12, 14, 16 connected to the local area network 18 are uniquely identified by the DHCP or static IP servers using unique MAC addresses. Each connected MAC address is assigned a unique IP address. The MAC addresses of connected mobile devices 12, 14, 16 and the IP address assigned to each MAC address is publically visible within the local are network. Thus, the unique identifiers for each of the mobile devices 12, 14, 16 in the local area network 18 results and can be readily obtained for use in the system 100 of the present disclosure.

The local area networking system 10 further includes a system server 24. The system server 24 is in communication with the first mobile device 14, for example, through at least one of the local area network server 20 and the wide area network 22. The system server 24 also has a processor coupled to a memory, which may be in the form of a non-transitory computer readable storage medium. The memory has processor-executable instructions and at least one database embodied thereon. The at least one database including a listing of the unique identifiers associated with the other devices 14 that are registered with the system server 24, and a listing of user identifiers and user profiles relating to the other devices 14 registered with the system server 24.

In the embodiment shown in FIG. 1, it should be appreciated that the first mobile device 12 and the second mobile device 14 are both registered with the system server 24, but that the third mobile device 16 is not registered with the system server 24. It should likewise be understood that, although the first mobile device 12 is able to discover the unique identifier associated with each of the mobile devices 12, 14, 16 in the local area network 20, only the user identifiers and user profiles of the first mobile device 12 and the second mobile device 14 are to be found and available in the system server 24.

The user identifiers in the at least one database of the system server 24 may be defined or otherwise selected by the user of each of the mobile devices 12, 14, 16 registered with the system server 24. The user profiles may include any user-defined information, as desired. As nonlimiting examples, the user profiles may include bibliographic information, geographic information, information on interests, and other relevant information relating to the user.

The system server 24 with the processor-executable software instructions is configured by the processor to communicate the listing of user identifiers and user profiles, relating to the other devices 14, 16 registered with the system server 24, to the first mobile device 12. Advantageously, the system server 24 permits the user of the first mobile device 12 to view the user identifiers and user profiles relating to the other devices 14, 16 registered with the system server 24.

It should be appreciated that the local area networking system 10 may further include at least one application developer computer 26 that is in communication with the system server 24. For example, the at least one application developer computer 26 may be provided with a module that permits a user of the application developer computer 26 to create and save on the memory of the system server 24, or directly onto one of the mobile devices 12, 14, computer-executable applications and other content that may be shared with the mobile devices 12, 14, 16 of the local area networking system 10. Likewise, the local are networking system 10 may include an administrator computer (not shown) in communication with the system server 24, which permits an administrator of the system server 24 to maintain and modify the processor-executable instructions and the at least one database of the system server 24, as desired.

Figure 2:
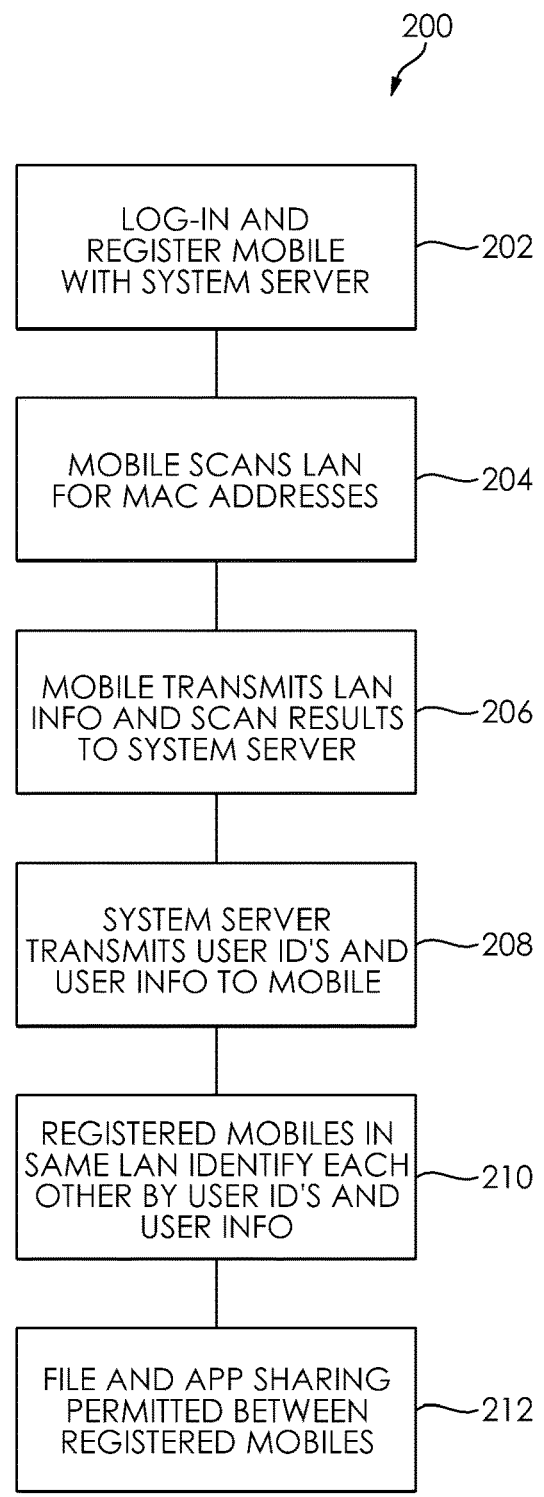
FIG. 2 is a flow diagram illustrating a method of using the local area networking system shown in FIG. 1, according to one embodiment of the present disclosure.

Referring now to FIG. 2, a particular method 200 of using the local area networking system 10 is described. The method 200 includes a step 202 of permitting the first mobile device 12 to login and register with the system server 24. The registration with the system server 24 may be accomplished by entering the user identifier and a password at a graphical user interface of the local area networking system 10 shown on the first mobile device 12, for example. It should be appreciated that other means for registering with the system server 24 may also be used within the scope of the present disclosure.

In a step 204, the first mobile device 12 performs a scan or query of the local area network 18 for the unique identifiers of each mobile device 12, 14, 16 in the local area network 18. In step 206, the first mobile device 12 transmits the local area network information, identifying the local area network 18, and the results of the scan, including the unique identifiers of each mobile device 12, 14, 16 in the local area network 18, to the system server 24 through the wide area network 22. It should be understood that, in the embodiment shown in FIG. 1, the second mobile device 14 likewise performs the scan or query of the local area network 18 and transmits the local area network information and the scan results including the unique identifiers to the system server 24 through the wide area network 22.

Upon receiving the local area network information and the unique identifiers from the first mobile device 12, the system server 24 correlates the listing of user identifiers and user profiles in the at least one database with the unique identifiers. In step 208, the system server 24 then communicates to the first mobile device 12 the listing of user identifiers and user profiles correlated with the unique identifiers back through the wide are a network 22.

In step 210, the user of the first mobile device 12 is permitted to view the user identifiers and user profiles relating to the other devices 14 registered with the system server 24, including the other devices 14 in the local area network 18. For example, a listing of the user identifiers of the registered other devices 14 in the local area network 18, together with the associated user profiles, may be shown on a graphical user interface of the first mobile device 12. The unique identifiers of the other devices 16 not registered with the system server 24 may also be shown on the graphical user interface, as desired.

Upon identification of the other devices 14 associated with the other registered users of the local area networking system 10, a sharing of at least one of a data file and an executable file is permitted between the registered first mobile device 12 and the registered second mobile device 14 in a step 212. As nonlimiting examples, the sharing or transfer of the at least one of the data file and the executable file may occur through one of direction communication between the first mobile device 12 and the second mobile device 14, communication between the first mobile device 12 and the second mobile device 14 over the local area network 18, and communication between the first mobile device 12 and the second mobile device 14 over the wide area network 22. Other suitable means for sharing the at least one of the data file and the executable file between the first mobile device 12 and the second mobile device 14 when registered may also be used within the scope of the disclosure.

In particular embodiments, the user of the first mobile device 12 is permitted to selectively block the sharing of the one of the data file and the executable file on the first mobile device 12 with at least one of the other devices 14 registered with the system server 24. The user of the first mobile device 12 may also be permitted to selectively make the user identifier and user profile of the first mobile device 12 undiscoverable by the other devices 14 registered with the system server 24 over at least one of the local area network and the wide area network. For example, upon registration, the user of the first mobile device 12 may elect to make the first mobile device 12 discoverable by the other devices 14 only within the local area network 18, and not outside of the local area network 18. As another example, the user of the first mobile device 12 may elect to make the first mobile device 12 discoverable by the other devices 14 only outside of the local area network 18, to permit sharing of the data file or the executable file over the wide area network 22.

Figure 3:
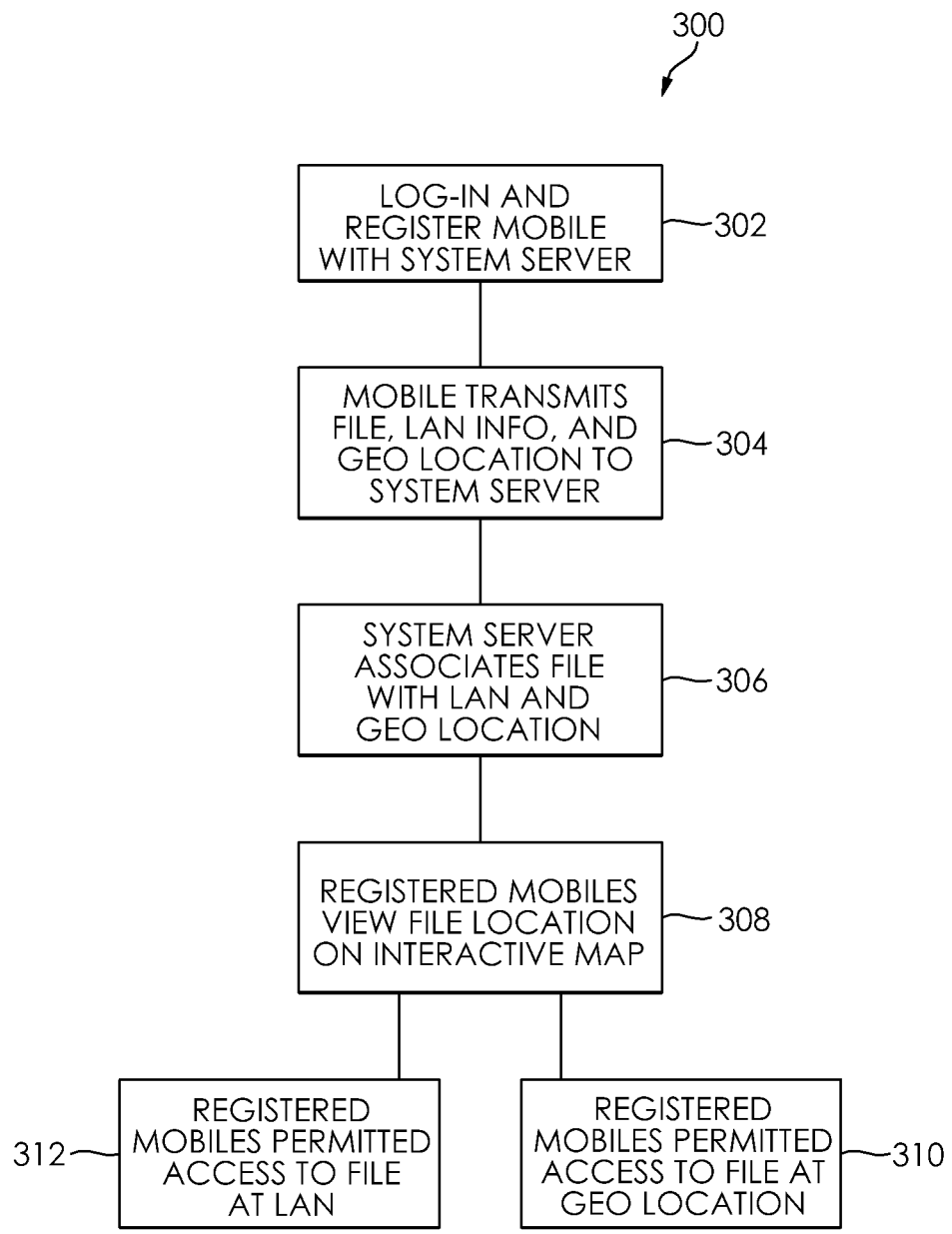
FIG. 3 is a flow diagram illustrating a method of using the local area networking system shown in FIG. 1, according to another embodiment of the present disclosure.

Another method 300 according to the present disclosure is shown in FIG. 3. The method 300 includes a step 302 in which the first mobile device 12 is permitted to log-in and register with the system server 24. The first mobile device 12 then transmits, in a step 304, identifying information about the local area network 18 and a geographical location of the local area network 18 to the system server 24. In a particular example, the geographical location is a set of coordinates including latitude and longitude. Other types of geographical locations including, for example, particular buildings, districts, towns, municipalities, counties, states, etc. may also be used, as desired.

The first mobile 12 may also transmit one of a data file and an executable file to the system server 24, either with the identifying information and the geographical location, prior to transmitting the identifying information and the geographical location, or subsequent to transmitting the identifying information and the geographical location. It should be appreciated that the one of the data file and the executable file may be stored in the database of the memory of the system server 24, for later access and retrieval.

In a step 306, the system server 24 associates the one of the data file and the executable file from the first mobile device 12 with the geographical location. The one of the data file and the executable file from the first mobile device 12 may also be associated with the identifying information for the local area network 18. In associating the one of the data file and the executable file with at least one of the geographical location and the identifying information for the local are network 18, it should be appreciated that the association is recorded in the at least one database on the memory of the system server 24, for example, for retrieval by or communication with the other registered devices 14 of the local area networking system 10.

Figure 15:
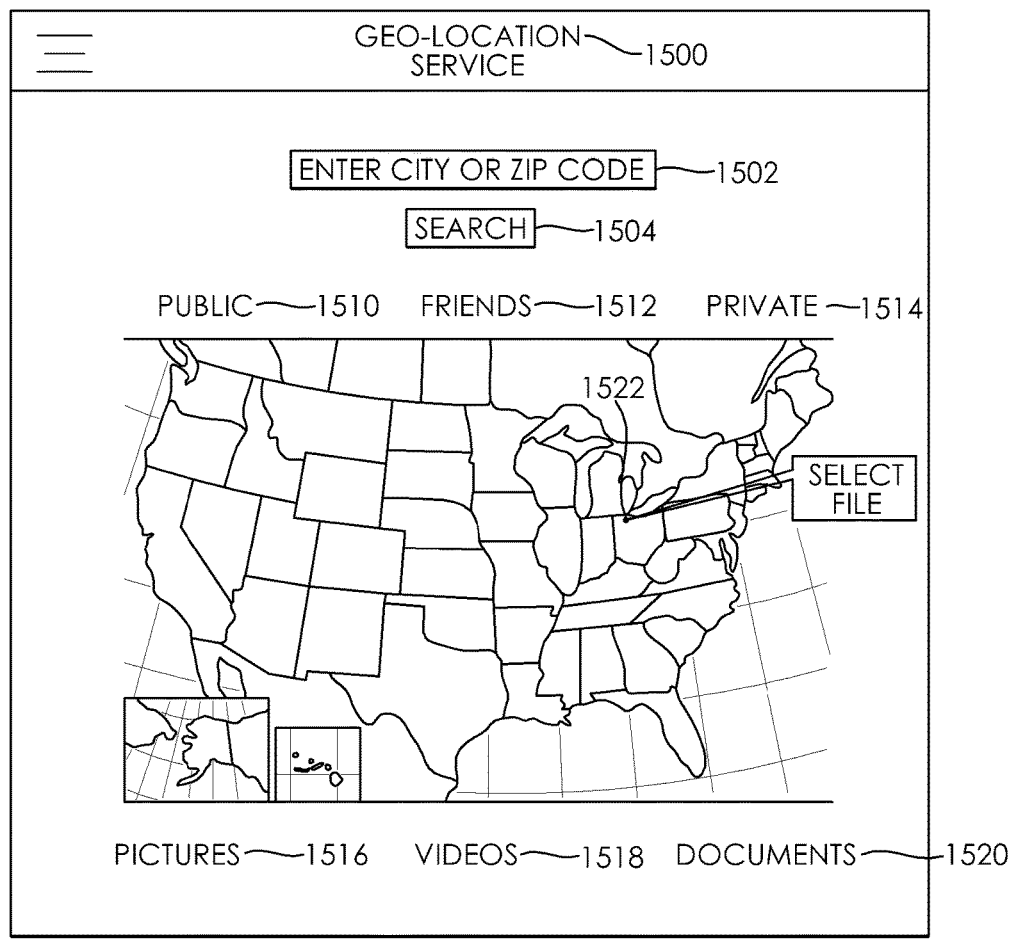
FIG. 15 is an illustrative screen shot of a mobile device in the local area networking system shown in FIG. 1, and further depicting a map-based geo-location service that offers users the ability to upload content at the location of the local area network, to be accessed by other users also at the local area network.

For example, in a step 308, and as depicted in FIG. 15, the other registered device 14 of the local area networking system 10 may be permitted to view the geographical location of the file on an interactive map represented on the graphical user interface of the other registered device 14. The other device 14 registered with the system server 24 is then permitted to access the one of the data file and the executable file from the first mobile device 12, which may be stored at the system server 24, when the other device 14 is also at the geographical location as in step 310. In another embodiment, shown as step 312, the other device 14 registered with the system server 24 is only permitted to access the one of the data file and the executable file when the other device 14 is in the local area network 18 associated with the file on the system server 24.

It should also be understood that other constraints may be placed by the user of the first mobile device 12 on the availability of the one of the date file and the executable file by others. For example, the other device 14 registered with the system server 24 may be permitted to access the one of the data file and the executable file from the first mobile device 12 only upon receipt of an approval by the user of the first mobile device 12. In another example, the user of the first mobile device 12 is permitted to make the interactive map one of publically available and privately available. Where privately available, the interactive map is only viewable by the other device 14 upon receipt of an approval by the user of the first mobile device 12.

FIGS. 4-6B shows an additional overview and details relating to the local area networking system 10 and methods of the present disclosure. Processes for creating an account and hardware communications of the networking system 10 are particularly illustrated.

Figure 4:
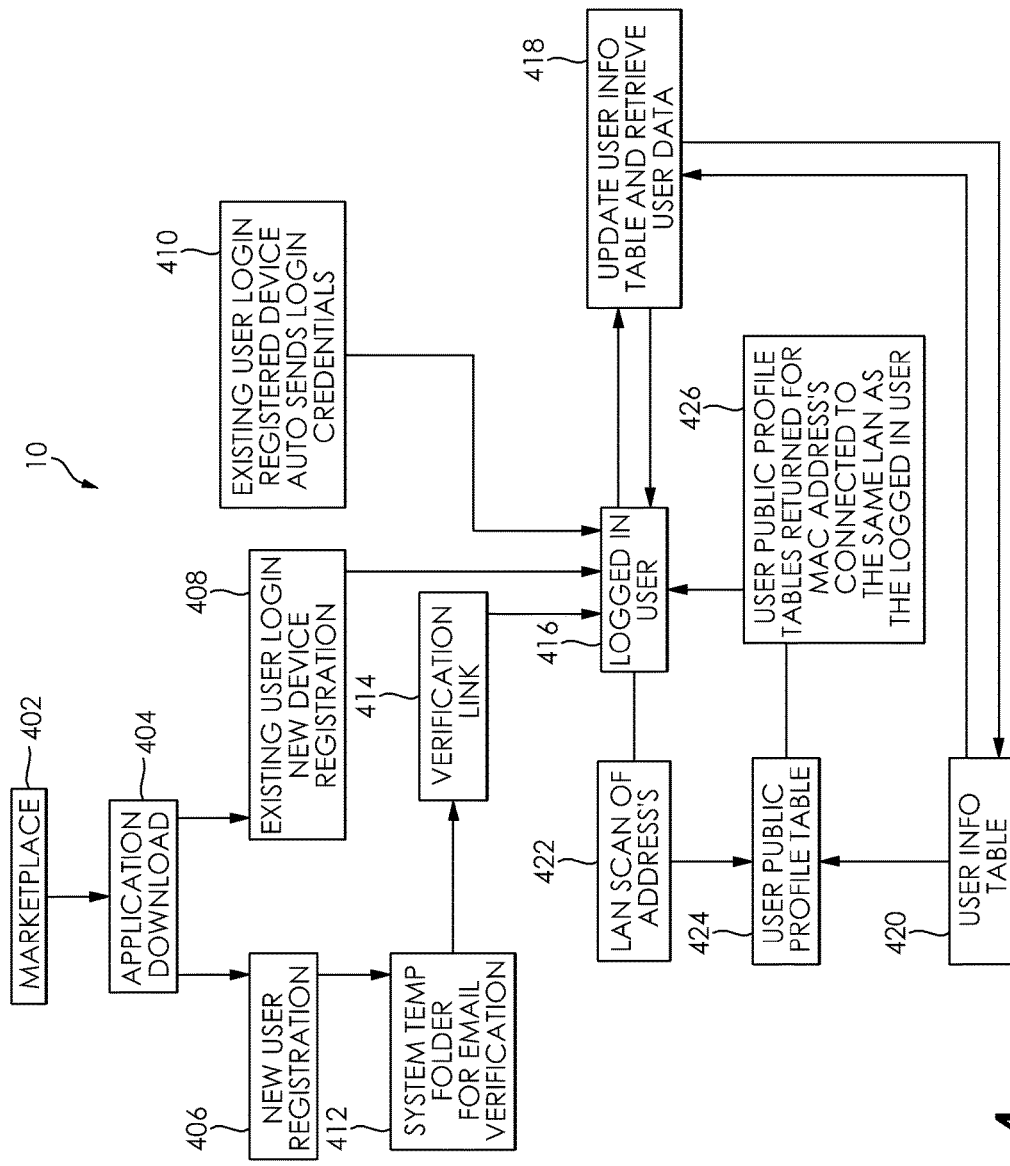
FIG. 4 is a flow diagram illustrating a method of creating an account and hardware communications using the local area networking system shown in FIG. 1.

For example, as shown in FIG. 4, the local area networking system 10 may include a marketplace 402 in communication with the wide area network 22, in which application downloads 404 to the mobile devices 12, 14 may be permitted. The application downloads 404 may include the applications necessary for the mobile devices 12, 14 to register and communicate with the system server 24 in a new user registration 406, for example. The new user registration 406 may further include the creation of a system temporary folder 412 on the system server 24, and the transmitting of a verification link 414 to the user, for example, by email or text.

Where the application has been previously downloaded onto one of the mobile devices 12, 14, an existing user login new device registration 408 is employed. In another example, an existing user login registered device may automatically send login credentials 410.

Upon the user logging in 416 and registering with the system server 24 using one of the mobile devices 12, 14 the user may update the user information table 420 or database and retrieve user data 418 stored in the memory of the system server 24. The user may also update the user public profile table 424 or database stored in the memory of the system server 24. In accordance with the methods described further hereinabove, the user public profile tables are returned 426 to the registered mobile devices 12, 14, permitting the users of the registered mobile devices 12, 14 to view the public profile information of the other users connected to the same local area network 18 as the logged in user.

Figure 5:
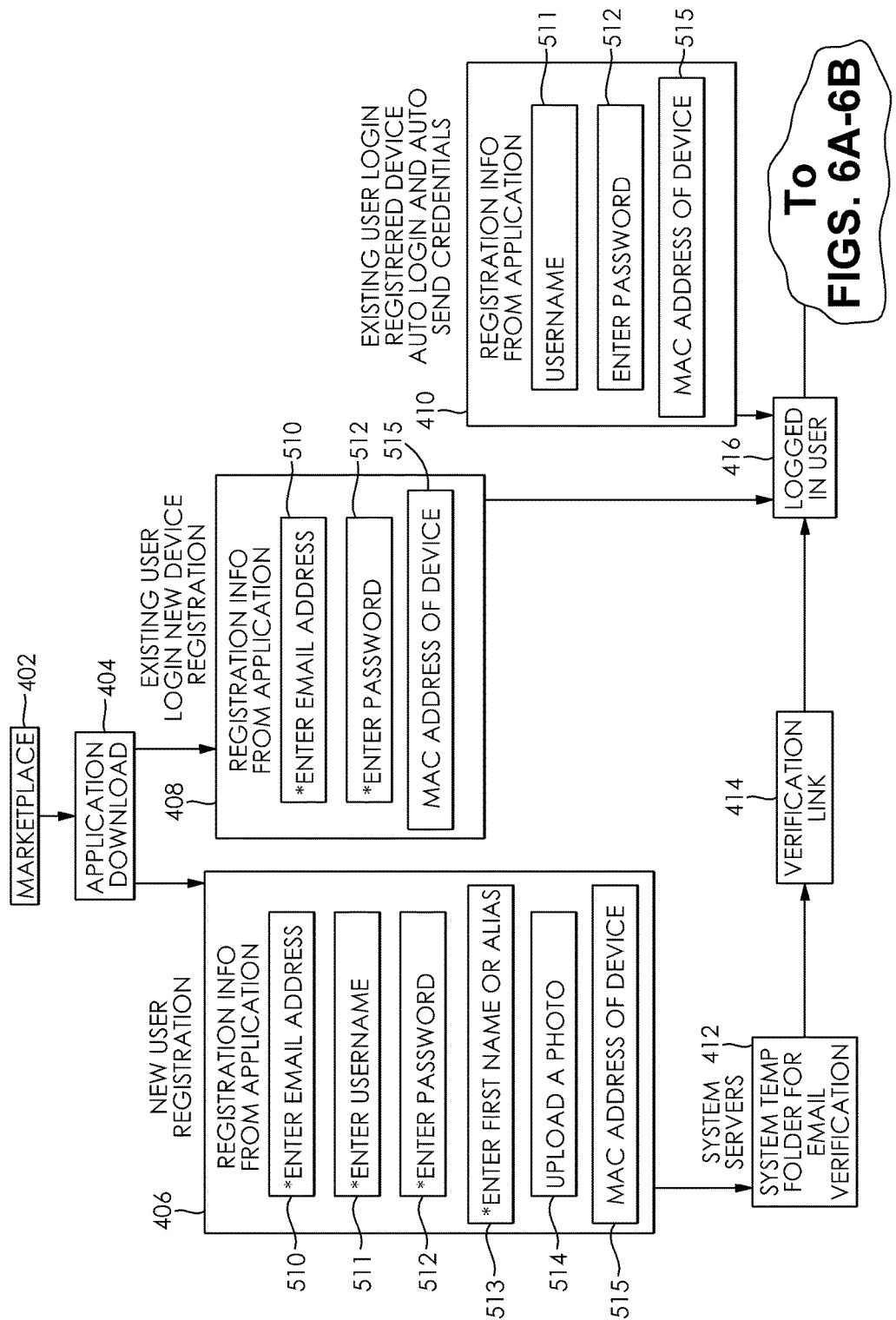
FIG. 5 is a flow diagram illustrating a registration and login process using the local area networking system shown in FIG. 1.

Referring now to FIG. 5, the registration and login process is further depicted. When a user enters the application, elements shown with a preceding asterisk (*) may be required for login, with the other elements shown being optional. In the new user registration 406, the user may be permitted to enter an email address 510, enter the user identifier or username 511, enter a password 512, enter a first name or alias 513 to be associated with the user, upload a photograph 514 to the system server 24 to be associated with the user, and to transmit the unique identifier, for example, the MAC address of the mobile device 12, 14 of the user within the local area network 12.

In the existing user login new device registration embodiment 408, the user may be permitted to enter the email address 510, enter the password 512, and transmit the unique identifier of the mobile device 12, 14 of the user to the system server 24. Similarly, in the existing user login registered device auto login and auto send credentials embodiment 410, the user may be permitted to enter the username 511, enter the password 512, and transmit the unique identifier of the mobile device 12, 14 of the user to the system server 24.

Figure 6A:
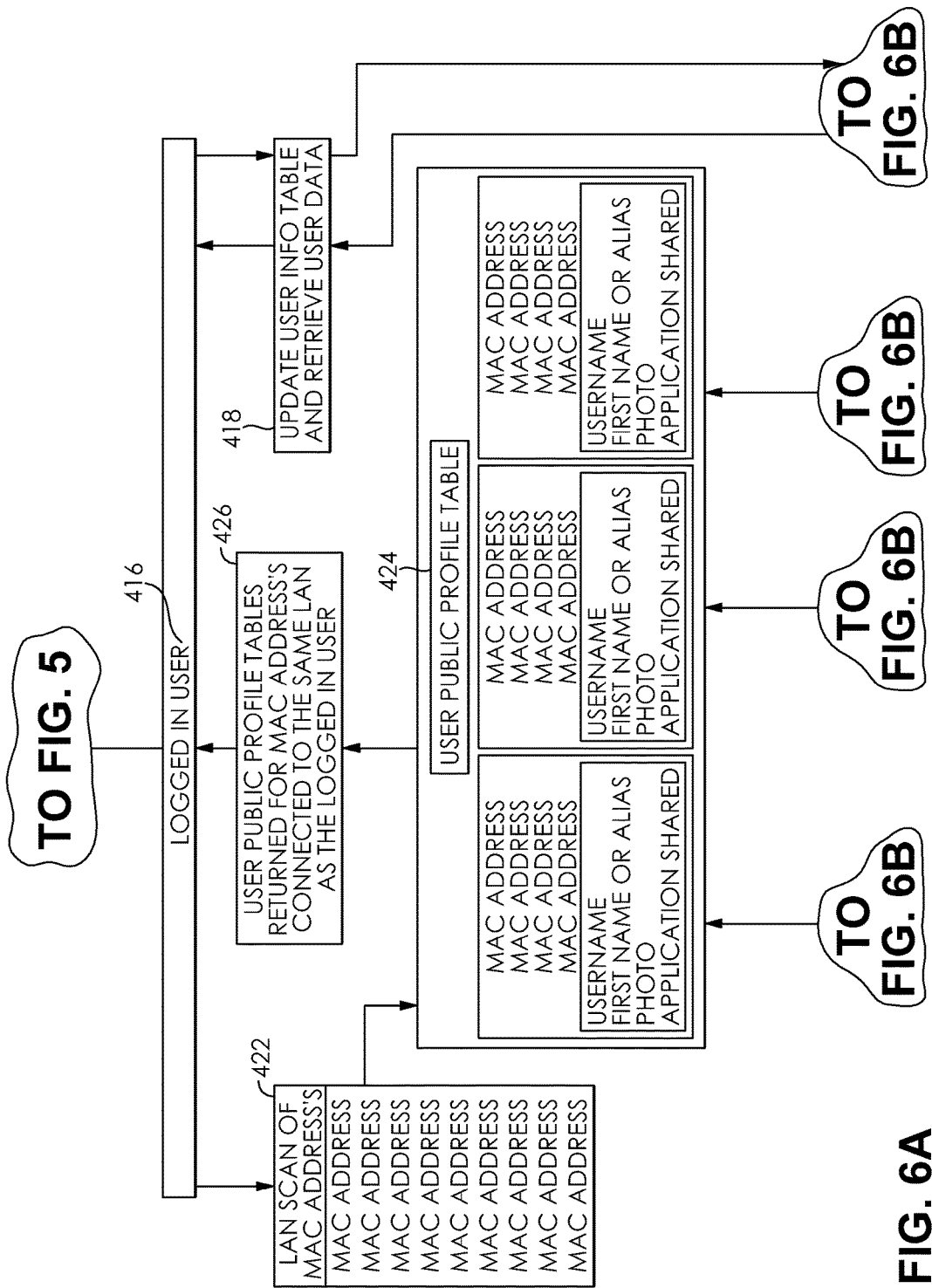
FIGS. 6A-6B are flow diagrams illustrating back end server communication post login using the local area networking system shown in FIG. 1.
Figure 6B:
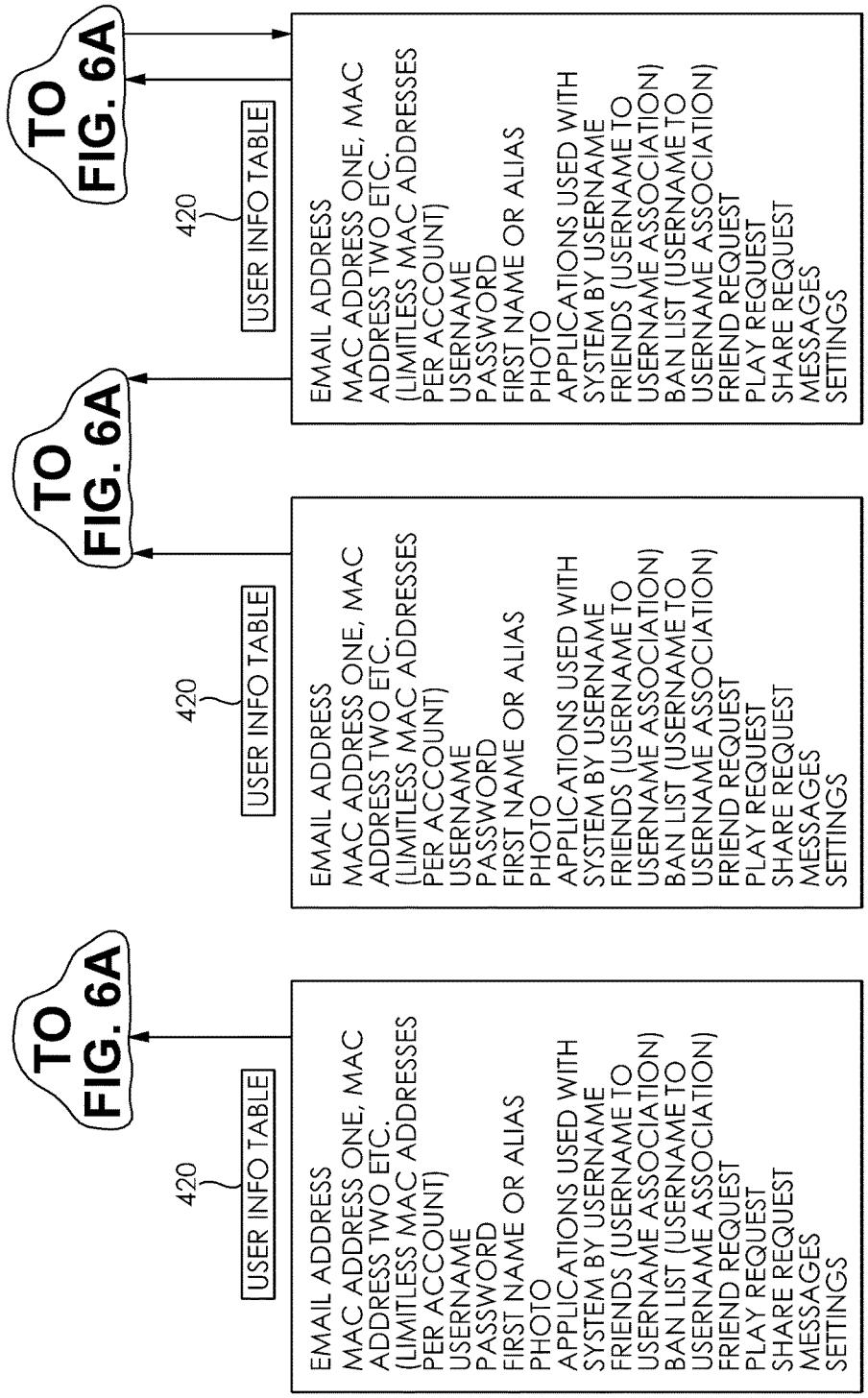

FIGS. 6A-6B depict a back end server communication post login. In particular, the FIGS. 6A-6B illustrate the relationship a logged in user may have to public profiles and the user information table or database on the system server 24. One of ordinary skill in the art should understand that other suitable database architectures are contemplated and may be used within the scope of the present disclosure.

Referring now to FIGS. 7-15, exemplary screen shots of the local area networking system 10, which may be provided on a graphical user interface of registered ones of the mobile devices 12, 14, are shown. The overall header 742 may provide users with tabs that include a Settings tab 730, a System tab 732, a Friends tab 734, a Notifications tab 736, a HotSpots tab 738, and a Search tab 740, for example, as shown in FIGS. 7-14. The sub header 752 offers information relative to the local area networking system 10 to which a user is currently connected. The sub header 752 shown in FIGS. 7-10 allow users to see the Hotspot Name 744 to which they are connected, the number of system users 746 connected to the same local area network 18, the number of total users 748 connected to the same local area network 18, and a Refresh button 750 allowing users to force an update and receive an updated login session of connected users.

In FIG. 7, the Settings tab 730 is shown including user controls and permissions. Users have the ability to change platform settings as well as application settings created internally or by third parties. For example, under a systems settings section 754, additional features may be selected such as: a "View Blocked Users by Username" feature 756, an "Allow System Access to Apps" feature 758; an "Allow the Transfer of Data Between Like Applications over System" feature 760; an "Allow the Transfer of Data Between Like Applications over System With Friends Only" feature 762; an "Allow System Applications Bluetooth Capability" feature 764, and a "Change Settings and Registered Info" feature 766. Under an application settings section 766, for example, additional features may be selected such as: an "App Name" feature 768; an "Allow the Transfer of Data in this Application over System" feature 770; an "Allow the Transfer of Data in this Application over System Between Friends Only" feature 772; and an "Allow Application Bluetooth Capability" feature 774. One of ordinary skill in the art may provide other suitable features in the system settings section 754 and the application settings section 766 for customization by the user, as desired.

Figure 8:
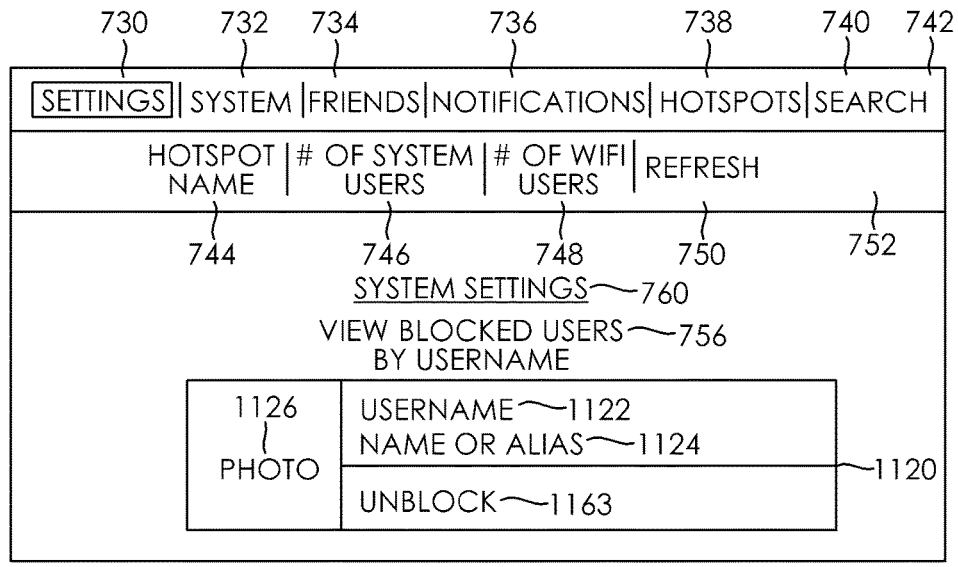
FIG. 8 is another illustrative screen shot depicting settings, including user controls and permissions, of a mobile device in the local area networking system shown in FIG. 1.

In FIG. 8, the system settings section 760 is further shown, including further user controls and permissions. In particular, the user has the unique ability to block other users, or unblock previously blocked users, by issuing or relinquishing a ban on a user by platform unique identifier. For example, under the "View locked Users by Username" feature 760, the user of the local area networking system 10 may view a username 1122 of another user of the local area networking system 10, as well as the other user's name or alias 1124. Similarly, the other user's public photo 1126 may also be shown. A block/unblock button 1163 may further be provided in order to facilitate the blocking and unblocking of the other user's ability to discover the mobile device 12.

Figure 9:
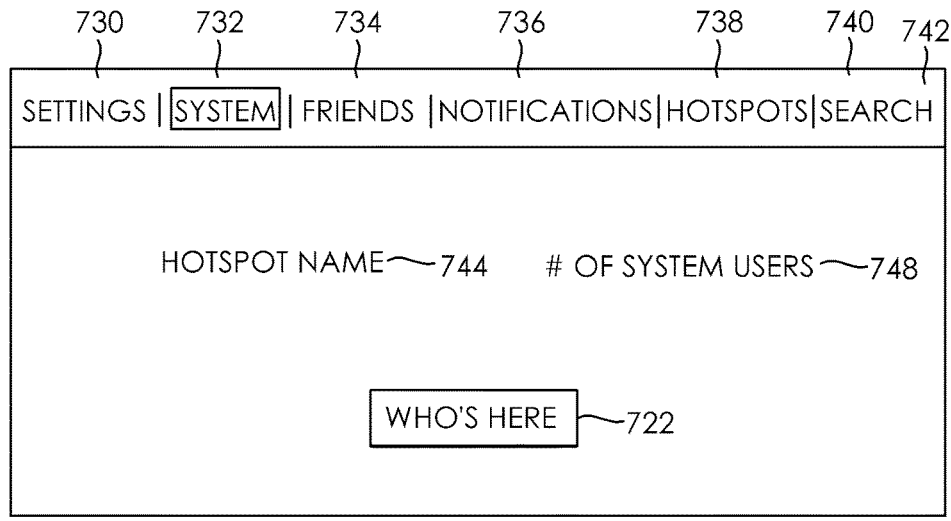
FIG. 9 is an illustrative screen shot of a mobile device in the local area networking system shown in FIG. 1, and further depicting a tab that allows users to search for other users in the local area network connection as well as how many connected users.
Figure 10:
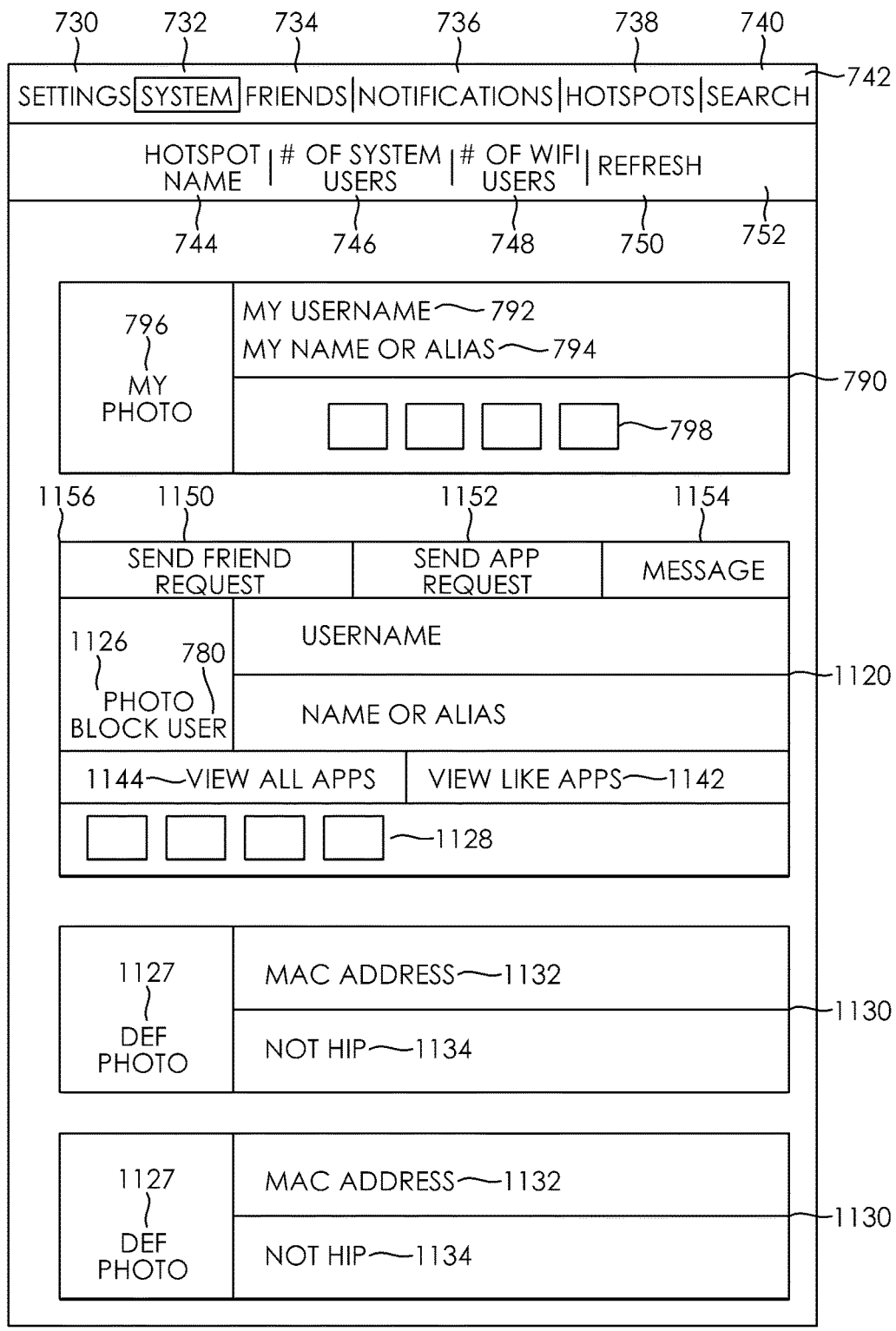
FIG. 10 is an illustrative screen shot of a mobile device in the local area networking system shown in FIG. 1, and further depicting a generated visual representation of the local area network on a graphical user interface of the mobile device, the visual representation including the results of a search from the screen shown in FIG. 9 for other users in the local area network connection.

In FIGS. 9-10, the System tab 732 is shown in further detail. The System tab 732 allows users to see the name 744 of the local area network connection 18 as well as how many connected users 748. Users then have the ability to select "Who's Here" that will preform a local area network scan, sending off all the connected MAC addresses to the local area network 18 for system profile recognition.

In FIG. 10, the System tab 732 is shown with the results returned from a "Who's Here" local area network scan. The results include user profiles 790, 1120, 1130 of individuals connected to the same local area network 18. The user profiles 790 of registered individuals include a username 792, which may be required as visible. Other elements include a user's actual name or alias 794, a photo 796 and the applications 798 each user shares with the local area networking system 10.

Users also have the ability to view all applications 1144 or view like applications 1142 within user profiles, send friend requests, send an application request and send a message.

As also shown in FIG. 10, the results include the unique identifiers, for example, the MAC addresses 1132 of unregistered individuals in the local area network 18. A customized name 1134 may be assigned by the user to these unregistered individuals, as well as a customized or default photo 1127 for the unregistered individuals, as desired.

Figure 11:
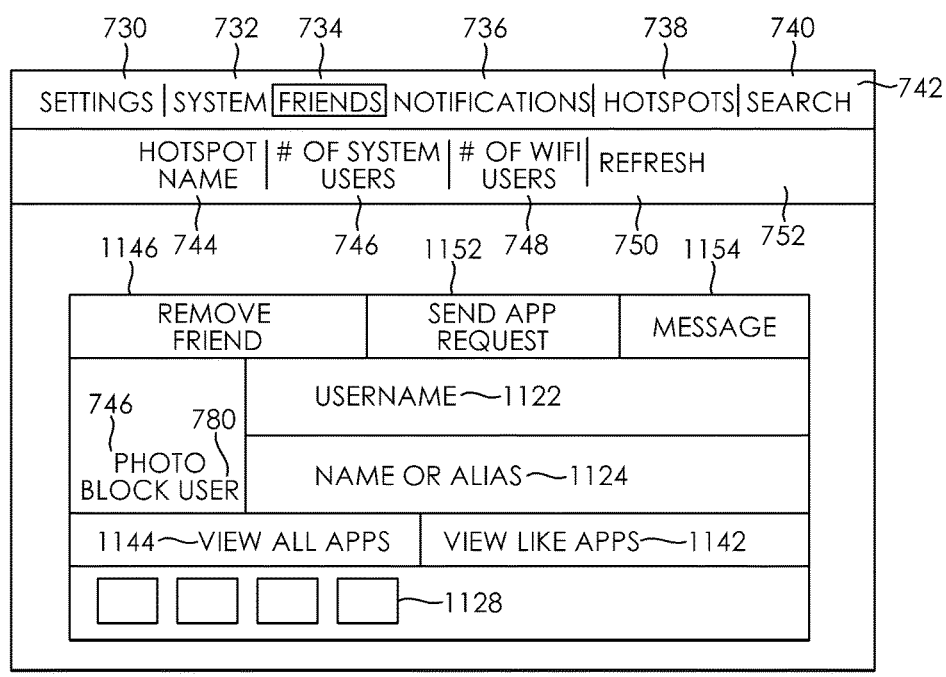
FIG. 11 is an illustrative screen shot of a mobile device in the local area networking system shown in FIG. 1, and further depicting a friends tab including user profiles of individuals who wish to remain connected outside of the local area network connection, and allowing communication and sharing to occur over a wide area network connection.

In FIG. 11, the Friends tab 734 is shown in further detail. The Friends tab 734 includes user profiles of individuals, including usernames 1122, actual names or aliases 1124, and photographs 746, who wish to remain connected outside of a local area network 18, allowing communication and sharing to occur over the wide area network 22. Users also have the ability to view like applications 1142 within user profiles, view all applications 1144, send friend requests, blocker users 780, send an application request 1152, and send a message 1154 over the wide area network 22 between users who have exchanged a request and approval to do so.

Also within the Friends tab 734, users have access to the sub header 752 allowing users to see the name 744 of the local area network 18 to which the logged in user is connected, the number of connected users 746 using the local area networking system 10 on the same local area network 18, the number of connected devices 748 on the local area network 18, and the Refresh button 750 allowing the list of connected users to be updated.

Figure 12:
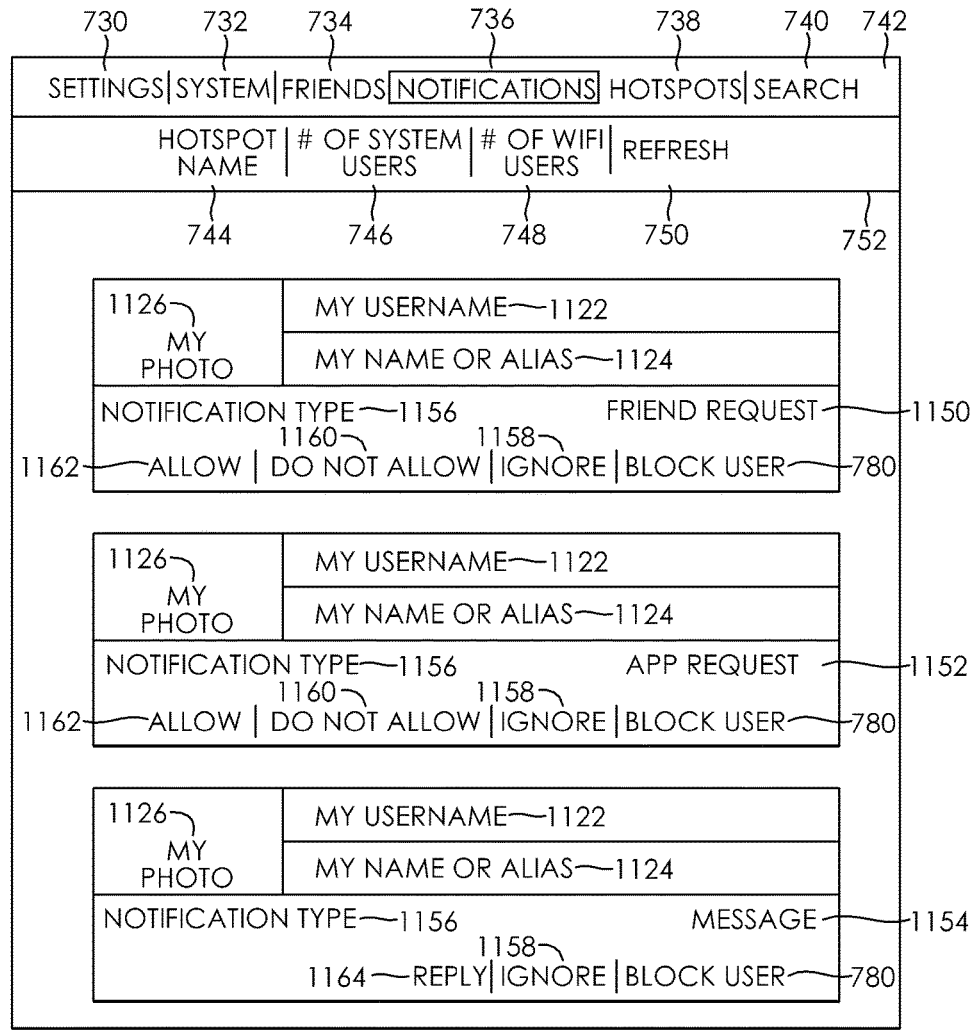
FIG. 12 is an illustrative screen shot of a mobile device in the local area networking system shown in FIG. 1, and further depicting a notifications tab including friend requests, application requests and messages as well as options for notification replies.

In FIG. 12, the Notifications tab 736 is further shown. Notification types 1156 include Friend Requests 1150, App Requests and Messages as well as options for notification replies, including: Reply 1164, Allow 1162, Do not Allow 1160, Ignore 1158, and Block User Requests 780.

Also within the Notifications tab 736, users have access to the sub header 752 allowing users to see the name 744 of the local area network 18 to which the logged in user is connected, the number of connected users 746 using the local area networking system 10 on the same local area network 18, the number of connected devices 748 on the local area network 18, and the Refresh button 750 allowing the list of connected users to be updated.

Figure 13:
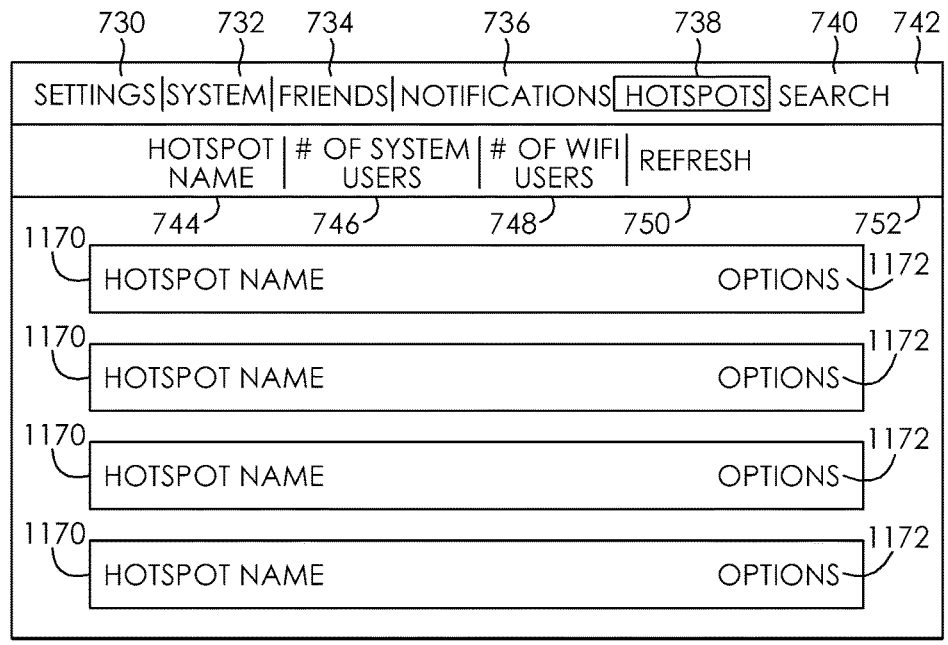
FIG. 13 is an illustrative screen shot of a mobile device in the local area networking system shown in FIG. 1, and further depicting a hotspot tab allowing users to see the name of the local area network connection the logged in user is connected to, the number of connected users using the system on the same local area network, and the number of connected devices on the local area network.

In FIG. 13, the HotSpots tab 738 is illustrated in greater detail, showing a plurality wireless access points or Hotspot names 1170 and related options 1172. Within the HotSpots tab 738, users have access to the sub header 752 allowing users to see the name 744 of the local area network 18 to which the logged in user is connected, the number of connected users 746 using the local area networking system 10 on the same local area network 18, the number of connected devices 748 on the local area network 18, and the Refresh button 750 allowing the list of connected users to be updated. The Hotspot tab 738 also allows for geo-location functionality by first showing the name 1170 of the Hotspot and the options 1172 that may be available to a user.

Figure 14:
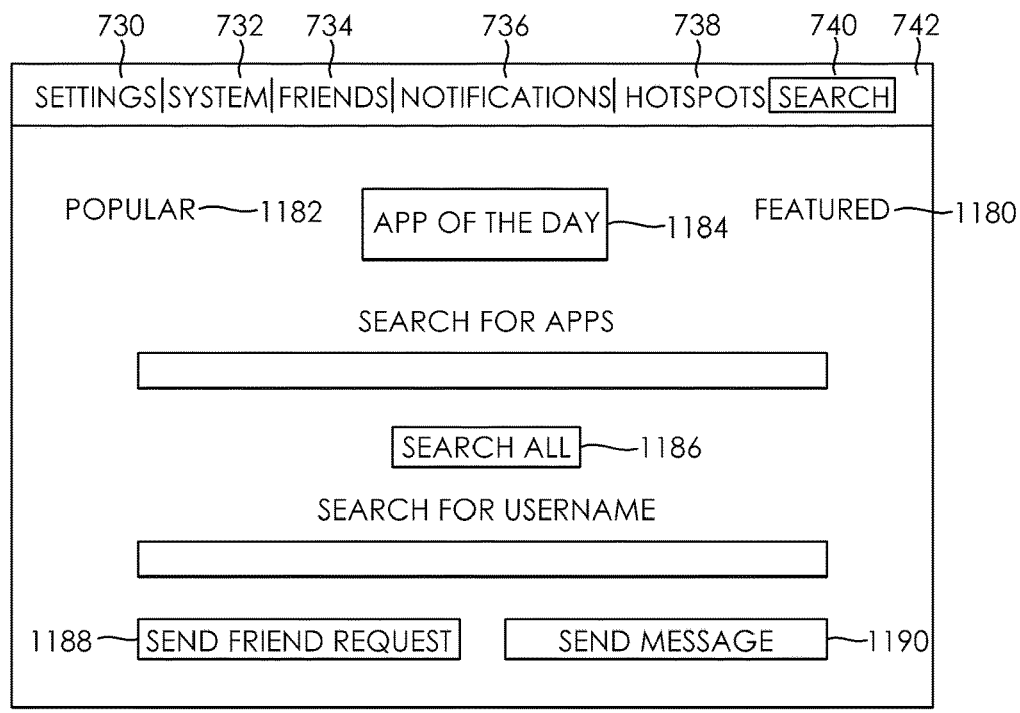
FIG. 14 is an illustrative screen shot of a mobile device in the local area networking system shown in FIG. 1, and further depicting a search tab allowing users to see popular applications being used with the system.

In FIG. 14, the Search tab 740 is further shown. The Search tab 740 may include a popular section 1182 that allows users to see the popular applications being used with the local area networking system 10. The Featured section 1180 allows users to view applications that developers wish to feature. The App of the Day feature 1184 allows users to view the application that administrators of the local area networking system 10 wish to feature. Users have the ability to search for applications by title, and search for users by a platform unique identifier that can be used to send a message 1190 or a Friend request 1188.

In FIG. 15, a particular application developed for the local area networking system 10 is shown. The application is a map-based geo-location service 1500 that offers users the ability to upload photos 1516, videos 1518, songs, documents 1520 and messages, publically or privately. The geographical location of Friends 1512 may also be identified. Public uploads 1510 will be visible by all connected users and subject to removal. Private uploads 1514 are only visible to a cast of users who share a connection authorization to making all uploads visible to users authorized to share content. It should be appreciated that all content is uploaded to a map location and not to a user profile, such that another user of the local area networking system 10 must go to the particular geographical location 1522, or the local area network 18 within that geographical location 1522, in order to access the uploaded photos 1516, videos 1518, songs, documents, 1520, messages, etc.

It should also be appreciated that the local area networking system 10 of the present disclosure is particularly advantageous, because users do not normally have high level privacy options within the local area network 18. Instead, within the local area network 18, users typically have low level privacy options to block another user by username.

All profiles are required to be public and visible by any user connected to the same local area network 18 as other users, providing a personal block has not been issued by one username to one username. Users of the local area networking system 10 have the ability to utilize all local area network 18 connection functionality with other users outside of the local area network 18 connection, providing the two users of the local area networking system 10 have exchange a request and approval to do so. All functionality of the local area network 18 will be available to both parties who exchange approval to do so over the wide area network 20 connection by the local area networking system 10.

Figure 16:
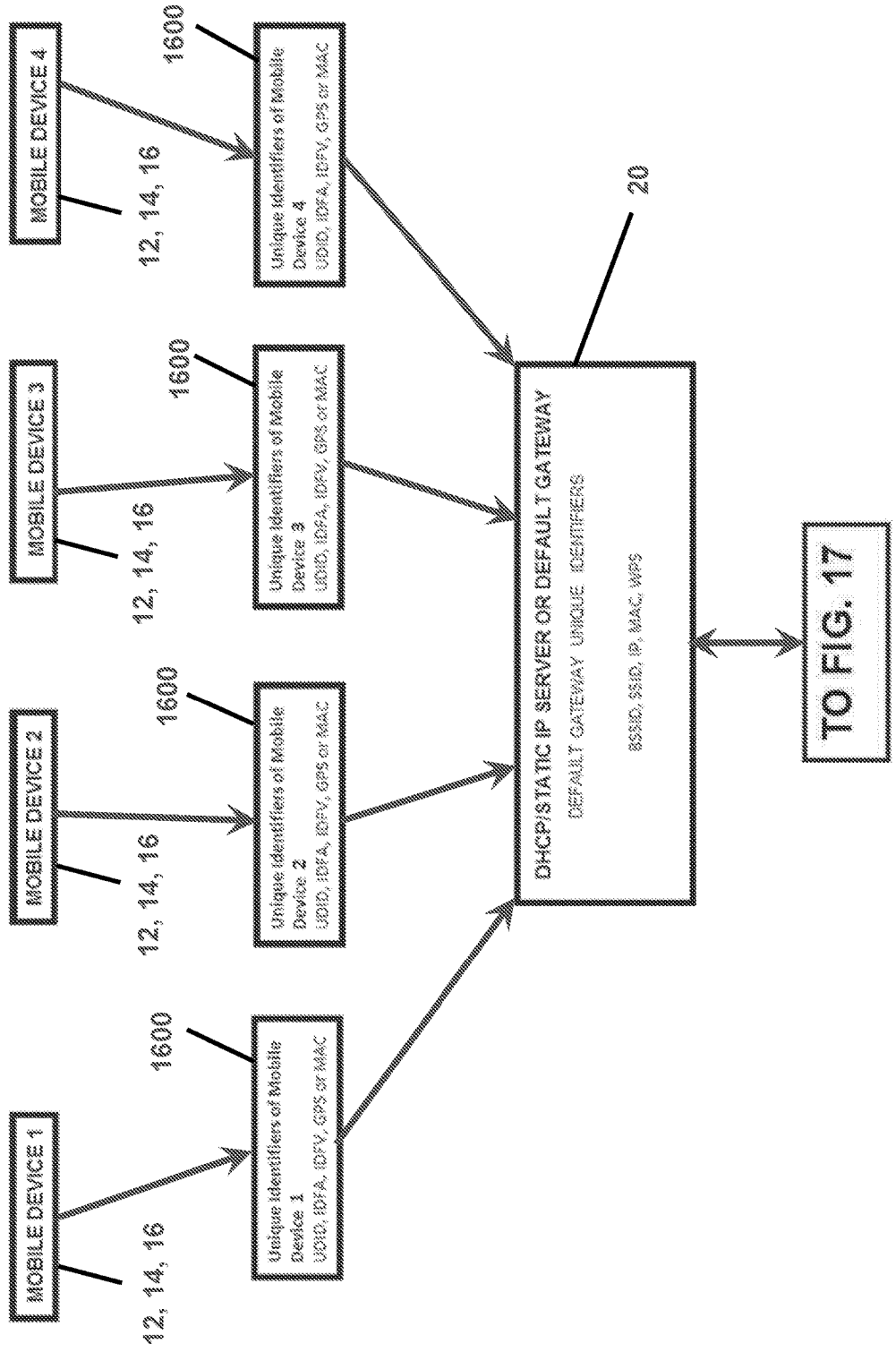
FIG. 16 is a schematic diagram of a local area networking system according to another embodiment of the present disclosure, showing unique identifiers of the DHCP/Static IP server or default gateway being identified by the mobile devices.
Figure 17:
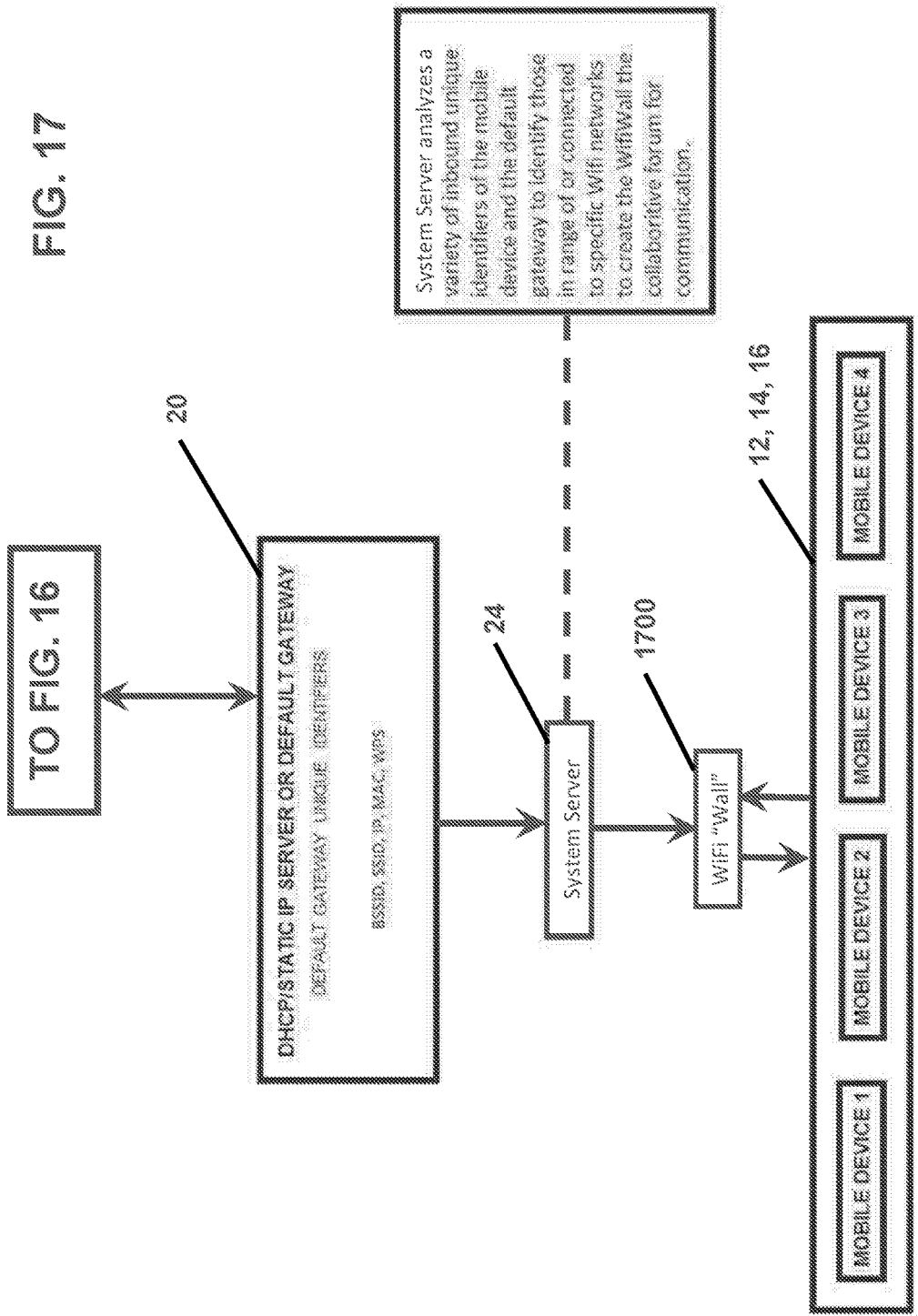
FIG. 17 is a schematic diagram of the local area networking shown in FIG. 16, and further depicting the mobile devices in communication with a system server that analyzes a variety of inbound unique identifiers of the DHCP/Static IP server or default gateway by the mobile device to identify those in range of or connected to a specific Wi-Fi network, in order to create a collaborative forum for communication.

FIGS. 16 and 17 depict a further embodiment according to the present disclosure. In FIG. 16, the local area network server 20 is a default gateway or DHCP/Static IP server as described hereinabove. A unique identifier of the local area network server 20 is used in conjunction with the unique identifiers 1600 of the mobile devices 12, 14, 16, when the mobile devices 12, 14, 16 are connected to or in range of the local area network server 20, in order to produce an electronic communication and/or collaboration forum 1700, also known as a Wi-Fi "wall" 1700, by and between those mobile devices 12, 14, 16 connected to or in range of the wireless local area network 18 connected with the local area network server 20. The wall 1700 is provided in the form of a visual representation of the local area network 18, generated on at least one of the mobile devices 12, 14, 16, together with information about the mobile devices 12, 14, 16, and other features as described herein.

In a particular embodiment, the wall 1700 is created by the system server 24, shown in FIG. 17. The system server 24 analyzes a variety of the inbound unique identifiers 1600 of the mobile devices 12, 14, 16 and the local area network server 20, in order to identify those mobile devices 12, 14, 16 in range of or connected to the wireless local area network 18 associated with the local area network server 20. The system server 24 may also store previously discovered unique identifiers 1600 of the local area network server 20, for future use by the mobile devices 12, 14, 16 even when outside of the local area network 18. The system server 24 then creates the wall 1700, which is a collaborative forum for communication that may be accessed by each of the mobile devices 12, 14, 16.

Where the mobile devices 12, 14, 16 are not connected to the wireless local area network 18, it should be appreciated that the system server 24 may be able to determine whether the mobile devices 12, 14, 16 are adjacent to or in range of the wireless local area network 18 by a geographical location of the mobile devices 12, 14, 16, particularly where the geographic location of the local area network server 20 is also stored in the database of the system server 24. In this case, the mobile devices 12, 14, 16 may query either the system server 24, or the local area server 20 indirectly over the Internet, for the unique identifiers of the mobile devices 12, 14, 16 within the local area network 18. For example, the mobile devices 12, 14, 16 may be considered adjacent or in range of the wireless local area network 18 when located within range (as a non-limiting example, between about 5 feet and 500 feet) of the geographic location of the wireless local area network 18. One of ordinary skill in the art may select other suitable distances from the geographic location of the wireless local area network 18 to be considered in range of or adjacent to the wireless local area network 18, as desired.

As non-limiting examples, the system server 24 may use a unique identifier of the local area network server 20, such as MAC, BSSID, SSID, IP or WPS, in conjunction with the unique identifiers 1600 of the mobile devices 12, 14, 16 connected to the local area network server 20 via the wireless local area network 18, in order to produce a communication and/or collaboration forum or wall 1700 by and between those mobile devices 12, 14, 16. The unique identifiers 1600 of the mobile devices 12, 14, 16, can include one or more of UDID, IDFA, IDFV, GPS, and MAC, also as non-limiting examples.

In another example, the system server 24 may use BSSID or SSID unique identifier of the local area network server 20 in conjunction with a UDID, IDFA, IDFV, GPS, or MAC unique identifiers 1600 of the mobile devices 12, 14, 16, in order to produce the wall 1700 by and between users in range of the BSSID or SSID being broadcast by the local area network server 20.

Further combinations of unique identifiers for the local area network server 20 and the mobile devices 12, 14, 16 are also contemplated and considered part of the present disclosure. For example, the system server 24 may require that the BSSID (or SSID) of the local area server 20 must match GPS of the mobile devices 12, 14, 16 or MAC and IP of the local area server 20 that the mobile devices 12, 14, 16 are connecting from in order for the mobile devices 12, 14, 16 to access the same wall 1700. In another example, mobile devices 12, 14, 16 that deliver identical MAC Address of the local area server 20 to the system server 24 will be granted access to a particular wall 1700. In another example, the GPS of the mobile device 12, 14, 16 must match the IP address of the local area network server 20 in order for the wall 1700 to be accessed. In a further example, the SSID of the local area network server 20 must match the GPS of the mobile device 12, 14, 16 in order to access the wall 1700. In yet another example, the MAC address (default gate) of the local area network server 20 must match the GPS of the device 12, 14, 16 in order for the mobile device 12, 14, 16 to access the wall 1700. In yet an additional example, the SSID of the local area network server 20 must match the IP address of the mobile device 12, 14, 16. It should be understood that each of these examples is non-limiting, in that other combinations of matching unique identifiers are contemplated and considered to be within the scope of the present disclosure.

The system and method of the present disclosure may further allow a user the ability to subscribe to various physical locations, either onsite within the wireless local area network 18 or remotely over the wide area network 22, and to view user activity from remote locations. In this regard, a user can be given the ability to search for publicly visible physical locations identified on the system server 24 via one of the mobile devices 12, 14, 16, and to subscribe remotely.

The wall 1700, where associated with a particular physical location, can have administrative rights that permit the administrator the ability to feature offers, discounts, promotions, items for sale, upload of user-defined details, advertisements content, etc. for the subscribers of a physical location, as well as the right to remove such subscribers. Likewise, a subscriber is permitted to claim such products, promotions, discounts, etc. offered by the administrator at the specifically physical location. These administrative rights can be assigned to other users of the system server 24 at the physical location by an administrator of the local area system server 30, to effectively give control of a wall 1700 to that user, at any time.

Where the wall 1700 is used, upon signing onto a wireless local area network 18 and logging into the application, which allows communication with the system server 24, users are able to post data (e.g., pictures, videos, documents, audio files, reviews, evaluations, experiences. offers, advertisements and other forms of communication, validation or authorization and electronic data) that include but are not limited to the shared forum of the wall 1700. The wall 1700 is a forum of communication by and between users whom are connected or subscribed to a specific local area network 18. When subscribing to the wall 1700, users advantageously have the ability to subscribe to their favorite locations providing they are at that location or searching for a specific location already captured by the system server 24. Upon subscribing to a location, users advantageously have the ability to view posts and comment to posts on the wall 1700 remotely. In creating the wall 1700, the first mobile device 12, 14, 16 scans the local area server 20 (e.g., a DHCP server) on the local area network 18 to determine unique identifiable information, including but not limited to IP address, MAC address, BSSID, and GPS location of the local area server 20 on the local area network 18. Using this captured data, the system server 24 is then able to determine when two or more users are connected to the same local area network 18 and will grant access to the wall 1700 associated with that local area network 18.

This system can be used for a variety of services including, but not limited to, communication, validation and/or authorization of individuals by mobile device.

While certain representative embodiments and details have been shown for purposes of illustrating the invention, it will be apparent to those skilled in the art that various changes may be made without departing from the scope of the invention, which is further described in the following appended claims.

What is claimed is:

1. A local area networking method, the method comprising the steps of:

providing a system server in communication with a first mobile device over a wide area network and having a processor coupled to a memory, the memory having processor-executable instructions and at least one database embodied thereon, the at least one database including a listing of unique identifiers associated with mobile devices and a local area server registered with the system server, and a listing of user profiles associated with the mobile devices registered with the system server;

correlating, by the system server, the unique identifiers associated with the mobile devices registered with the system server and the unique identifier associated with the local area server to define an electronic communication or collaboration forum of a local area network, wherein the unique identifiers of the mobile devices registered with the system server are a combination of GPS and either MAC or IP, and the unique identifiers associated with the local area server are BSSID or SSID; and generating, by the system server on a graphical user interface of the first mobile device, a visual representation of the electronic communication or collaboration forum of the local area network including the mobile devices within the local area network and registered with the system server, the visual representation including a name of the local area network, at least a portion of the user profiles of the mobile devices within the local area network that are registered with the system server and sharing content, a notifications control providing at least one of friend requests, application requests and messages to the first mobile device from the mobile devices within the local area network, and a refresh control configured to allow the first mobile device to force an update of the visual representation, and wherein at least a portion of the visual representation is shared by all of the registered mobile devices in the local area network, wherein the first mobile device is permitted to communicate or collaborate with the mobile devices registered with the system server and within the local area network via the graphical user interface, wherein the first mobile device is permitted to subscribe to a physical location associated with the local area network while in the local area network, and to one of view, communicate to a user, share, and identify an activity of the mobile devices within the local area network and registered with the system server from remote locations by interacting with the visual representation of the electronic communication or collaboration forum of the local area network via the wide area network, and wherein the system server permits an individual to provide at least one of advertisements, feature offers, discounts, promotions, and items for sale on the visual representation of the local area network.

2. The local area networking method of claim 1, wherein the unique identifiers associated with the first mobile device and the mobile devices of the local area network are received by the system server, and the listing of user profiles correlated with the unique identifiers are communicated, through the wide area network.

3. The local area networking method of claim 2, wherein the wide area network is the Internet.

4. The local area networking method of claim 1, wherein the first mobile device is permitted to search for a physical location associated with the local area network and subscribe to the physical location from remote locations via the wide area network.

5. The local area networking method of claim 1, wherein a user of one of the first mobile device is permitted to claim the at least one of the advertisements, offers, discounts, promotions, and items for sale via the visual representation.

6. The local area networking method of claim 1, wherein an administrator is permitted access to user data analytics of user activity, both locally and remotely.

7. A local area networking system, comprising:
a system server in communication with a first mobile device over a wide area network and having a processor coupled to a memory, the memory having processor-executable instructions and at least one database embodied thereon, the at least one database including a listing of unique identifiers associated with mobile devices and a local area server registered with the system server, and a listing of user profiles associated with the mobile devices registered with the system server, wherein the system server correlates the unique identifiers associated with the mobile devices registered with the system server and the unique identifier associated with the local area server to define an electronic communication or collaboration forum of a local area network, wherein the unique identifiers of the mobile devices registered with the system server are a combination of GPS and either MAC or IP, and the unique identifiers associated with the local area server are BSSID or SSID, wherein the system server generates, on a graphical user interface of the first mobile device, a visual representation of the electronic communication or collaboration forum of the local area network including the mobile devices within the local area network and registered with the system server, the visual representation including a name of the local area network as defined by the local area server, at least a portion of the user profiles of the mobile devices within the local area network that are registered with the system server and sharing content, a notifications control providing at least one of friend requests, application requests and messages to the first mobile device from the mobile devices within the local area network, and a refresh control configured to allow the first mobile device to force an update of the visual representation, and wherein at least a portion of the visual representation is shared by all of the registered mobile devices in the local area network, wherein the first mobile device is permitted to communicate or collaborate with the mobile devices registered with the system server and within the local area network via the graphical user interface, wherein the first mobile device is permitted to subscribe to a physical location associated with the local area network while in the local area network, and to one of view, communicate to a user, share, and identify an activity of the mobile devices within the local area network and registered with the system server from remote locations by interacting with the visual representation of the electronic communication or collaboration forum of the local area network via the wide area network, and wherein the system server permits an individual to provide at least one of advertisements, feature offers, discounts, promotions, and items for sale on the visual representation of the local area network.

8. The local area networking system of claim 7, wherein the first mobile device is permitted to search for a physical location associated with the local area network and subscribe to the physical location from remote locations via the wide area network.

9. The local area networking system of claim 7, wherein a user of one of the first mobile device is permitted to claim the at least one of the advertisements, offers, discounts, promotions, and items for sale via the visual representation.

10. The local area networking system of claim 7, wherein an administrator is permitted access to user data analytics of user activity, both locally and remotely.

11. A local area networking method, the method comprising the steps of:
providing a system server in communication with a first mobile device over a wide area network and having a processor coupled to a memory, the memory having processor-executable instructions and at least one database embodied thereon, the at least one database including a listing of unique identifiers associated with mobile devices and a local area server registered with the system server, and a listing of user profiles associated with the mobile devices registered with the system server;

correlating, by the system server, the unique identifiers associated with the mobile devices registered with the system server and the unique identifier associated with the local area server to define an electronic communication or collaboration forum of a local area network; and generating, by the system server on a graphical user interface of the first mobile device, a visual representation of the electronic communication or collaboration forum of the local area network including the mobile devices within the local area network and registered with the system server, the visual representation including
- a name of the local area network,
- at least a portion of the user profiles of the mobile devices within the local area network that are registered with the system server and sharing content,
- a notifications control providing at least one of friend requests, application requests and messages to the first mobile device from the mobile devices within the local area network, and
- a refresh control configured to allow the first mobile device to force an update of the visual representation, and wherein at least a portion of the visual representation is shared by all of the registered mobile devices in the local area network, wherein the first mobile device is permitted to communicate or collaborate with the mobile devices registered with the system server and within the local area network via the graphical user interface, and wherein the first mobile device is permitted to subscribe to a physical location associated with the local area network while in the local area network, and to one of view, communicate to a user, share, and identify an activity of the mobile devices within the local area network and registered with the system server from remote locations by interacting with the visual representation of the electronic communication or collaboration forum of the local area network via the wide area network, wherein the first mobile device is also permitted to communicate or collaborate with the mobile devices registered with the system server and not within the local area network but adjacent to the local area network via the graphical user interface, the mobile devices considered adjacent to the local area network when they are within a predetermined range of a geographic location of the local area network, the geographical location of the local area network further stored in the at least one database of the memory of the system server, and wherein the predetermined range is between 5 feet and 500 feet from the local area network.

12. The local area networking method of claim 1, wherein a user of the first mobile device is permitted to play games with users of the mobile devices registered with the system server.

* * * * *